(12) United States Patent
Miller et al.

(10) Patent No.: US 8,821,646 B1
(45) Date of Patent: Sep. 2, 2014

(54) COMPOSITIONS AND METHODS FOR CLEANING AND PREVENTING PLUGGING IN MICRO-IRRIGATION SYSTEMS

(76) Inventors: John C. Miller, Fresno, CA (US);
Deborah L. Miller, Fresno, CA (US)

( * ) Notice: Subject to any disclaimer, the term of this patent is extended or adjusted under 35 U.S.C. 154(b) by 724 days.

(21) Appl. No.: 12/313,174

(22) Filed: Nov. 18, 2008

Related U.S. Application Data

(63) Continuation-in-part of application No. 11/342,905, filed on Jan. 30, 2006.

(51) Int. Cl.
*B08B 9/032* (2006.01)
*C11D 3/20* (2006.01)

(52) U.S. Cl.
USPC .......... 134/22.12; 71/32; 134/22.14; 510/109

(58) Field of Classification Search
None
See application file for complete search history.

(56) References Cited

U.S. PATENT DOCUMENTS

| | | |
|---|---|---|
| 6,312,493 B1 | 11/2001 | Eltink et al. |
| 6,706,666 B2 | 3/2004 | Hasebe et al. |
| 2004/0033923 A1* | 2/2004 | McClung ............ 510/302 |
| 2004/0250582 A1 | 12/2004 | Ambri et al. |

FOREIGN PATENT DOCUMENTS

| | | | | |
|---|---|---|---|---|
| CA | 2005970 | * | 6/1990 | ............ C02F 5/14 |
| JP | 2004-217919 | * | 8/2004 | ............ C11D 7/18 |

OTHER PUBLICATIONS

Robert G. Evans, Microirrigation, www.sidney.ars.usda.gov/Site_Publisher_Site/ . . ./Mircoirrigatin.pdf.*
IND/AG of Fresno California, "N-pHURIC Low Volume Irrigation Systems" brochure, 2 pages (6 brochure sides).
Monterey AgResources of Fresno, California, "N-pHURIC GTO" flyer (1 page).
Agrium of Calgary, Alberta, Canada, "N-pHURIC 10/55 fertilizer fact sheet" (1 sheet with 2 pages).

* cited by examiner

*Primary Examiner* — Yun Qian

(74) *Attorney, Agent, or Firm* — Joan I. Norek; The Law Office of Joan I. Norek

(57) ABSTRACT

An irrigation system cleaning formulation contains a sufficient concentration of a water-soluble organic acid which has a pK(1)a of less than about 4.0. A cleansing irrigation water contains a sufficient amount of such cleaning formulation, and a method of cleaning an irrigation system uses such cleaning formulation.

2 Claims, 3 Drawing Sheets

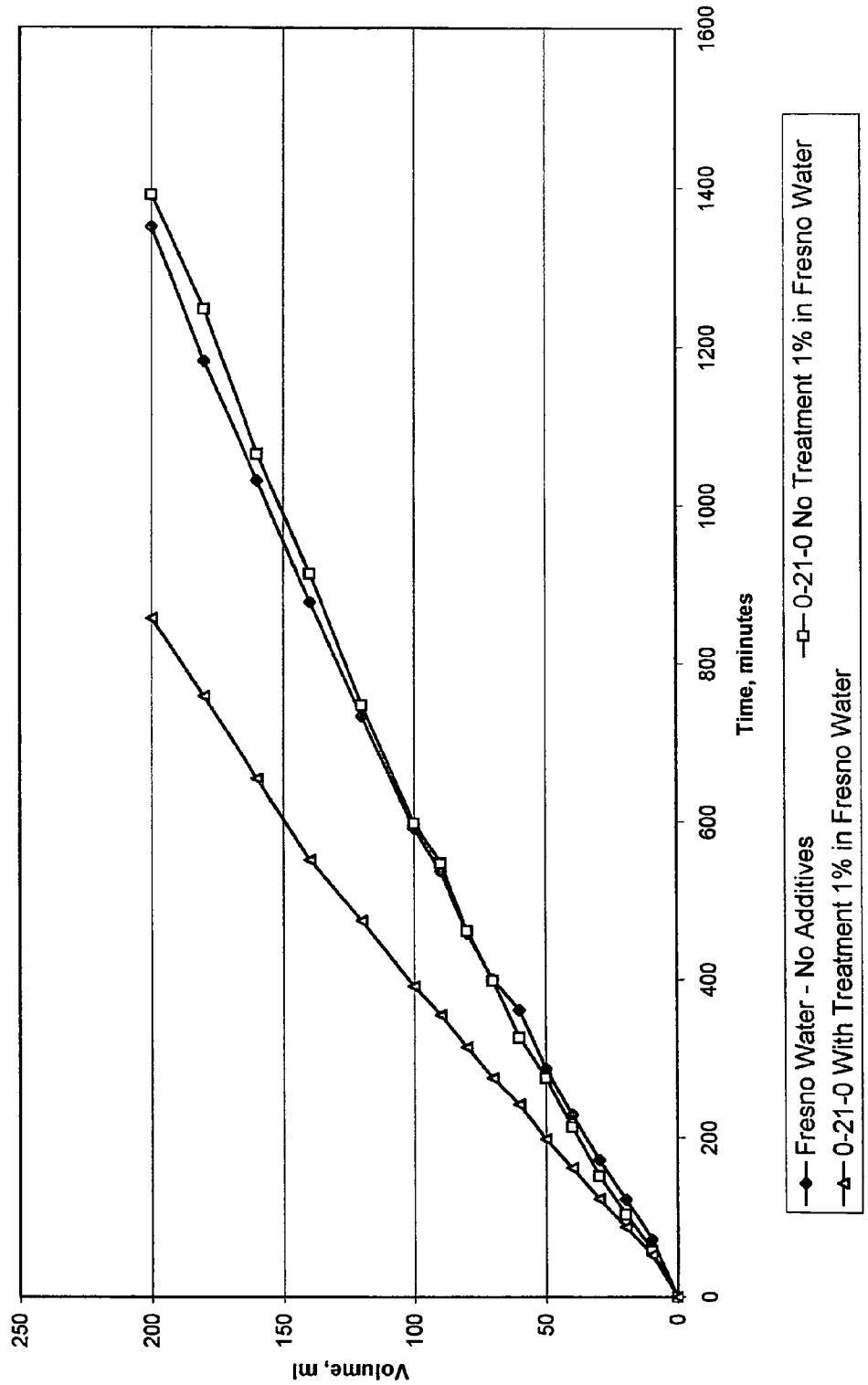

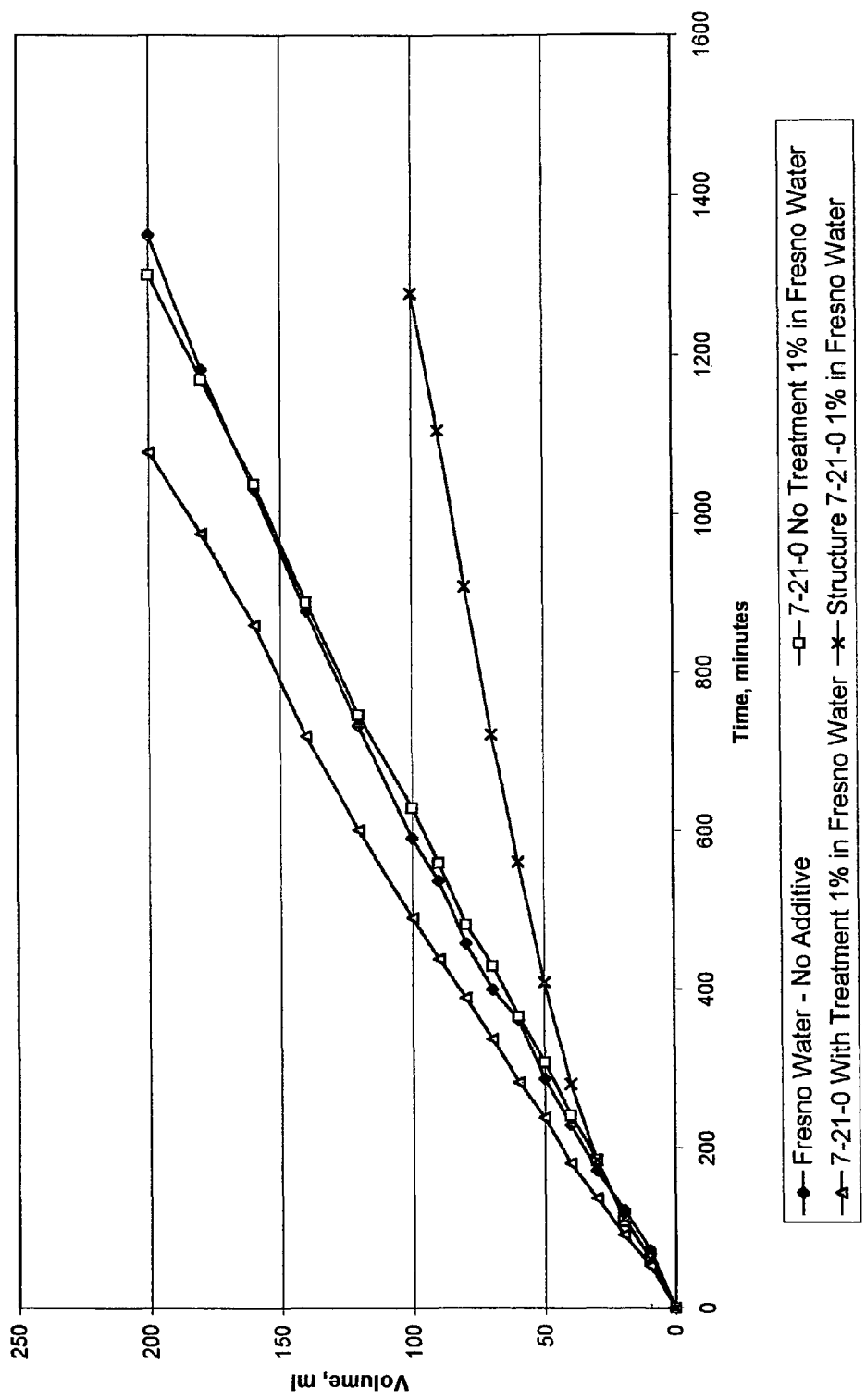

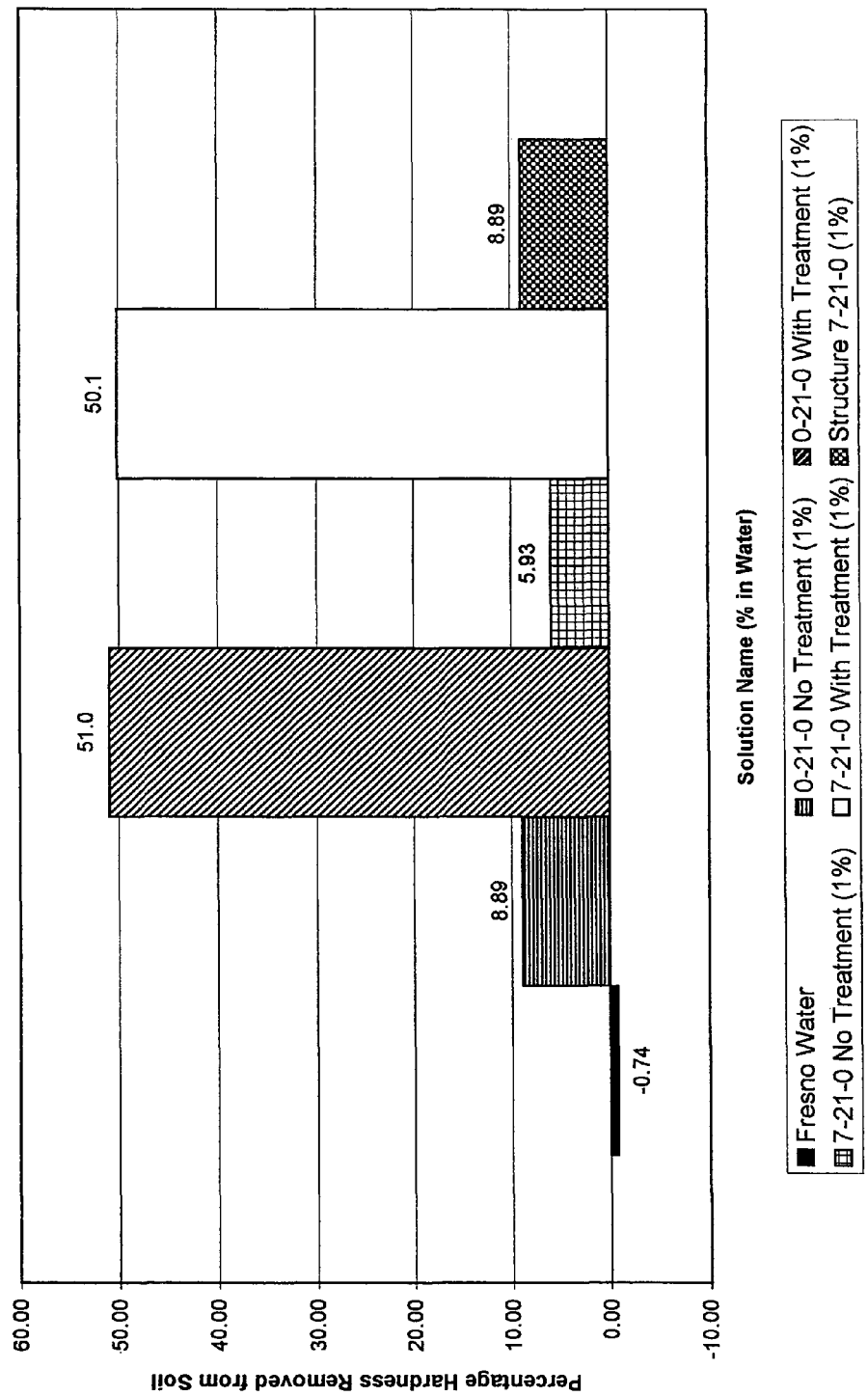

COMPOSITIONS AND METHODS FOR CLEANING AND PREVENTING PLUGGING IN MICRO-IRRIGATION SYSTEMS

This application is a continuation in part of co-pending application Ser. No. 11/342,905, filed Jan. 30, 2006, inventors Miller et al., for Compositions and Method for Preventing Plugging in Micro-Irrigation Systems.

BACKGROUND OF THE INVENTION

The present invention relates to methods and compositions for adding fertilizers and/or soil amendments to micro-irrigation systems.

The agriculture industry has developed the practice of adding plant nutrients and soil amendments to the plant environs, such as the soil, to enhance crop growth and subsequent yields. These fertilizers and amendments come in a variety of formulations depending on the specific crop to be grown and its nutrient requirements.

Fertilizers generally are classified according to their NPK content. NPK is common terminology used in the fertilizer industry and stands for: (1) N—the amount of nitrogen in the formulation as N; (2) P—the amount of phosphorus in the formulation as $P_2O_5$; and (3) K—the amount of potassium in the formulation as $K_2O$.

Depending on the formulation of the fertilizer, the fertilizer can also act as a soil amendment, or soil amendment agent, which is a material that conditions the soil, particularly the structure of the soil. Typical soil amendment agents include minerals, such as gypsum and lime, and acids, such as sulfuric acid or urea-sulfuric acid mixtures. The benefits of these amendments include, without limitation: (1) soil structure improvement; (2) sodic soil reclamation; (3) soil crusting prevention (aids in seedling emergence); (4) compacted soil loosening; (5) nutrient absorption improvement; (6) water run-off and erosion prevention; and (7) subsoil pH adjustment (impacts nutrient availability for absorption).

Mankind learned to add these fertilizers/soil amendments centuries ago to grow better crops to feed the ever-increasing population. Initially, these materials were typical inorganic compounds that were mined by the local natives and simply added to the soil in which the crop was grown. As the population increased further, irrigation of the land to improve crops and crop yields became another common agricultural practice. Fertilization methods ultimately were facilitated by the practice of adding inorganic fertilizers and soil amendments to the water being used to irrigate the crops. The term "fertigation" is sometimes used for this combination of irrigation and fertilization. Although the early techniques were extremely crude by today's standards, the techniques nonetheless obtained better yields and drastically minimized the labor of applying these fertilizers.

Today's high demand for crops (food crops and otherwise) has turned agriculture into a technically-sophisticated business, and a business in which large corporate farms dominate the small family farm. The technical challenges faced by the modern agricultural industry include both the ever-increasing need for arable land, especially in the western and southwestern United States, and the decreasing availability and increasing cost of water. To meet the need for water conservation, today's technology includes micro-irrigation systems that deliver very precise amounts of water directly to the plant that is being grown. In the past 20 to 30 years a large percentage of crop producers in the western and southwestern United States have converted to irrigation systems utilizing this micro-irrigation technology.

Similar to the advent of "fertigation" practices generally, upon conversion to micro-irrigation systems, modern farmers began adding fertilizers and soil amendments to them. In micro-irrigation systems, unfortunately, water quality and the inclusion of fertilizers and other additives cause severe problems. The problems arise from a number of factors. (1) The micro-irrigation water is typically obtained from wells, reservoir, lakes, or rivers which contain various amounts of dissolved minerals. (2) Fertilizers, soil amendments and other additives can form insoluble salts and/or cause particulate formation when added to the water. Macro-irrigation systems mainly tolerate these conditions, while micro-irrigation systems are extremely intolerant.

The sensitivity of micro-irrigation systems to water quality and additives stems from the refinement of the components in a micro-irrigation system. In order to add precise amounts of water directly to the plant or crop being irrigated, micro-irrigation systems contain devices called emitters, micro-sprinklers or other such devices. These devices deliver the desired precise amounts of water so long as they do not plug or foul. Plugging occurs when deposits, from any source, build up inside these devices. The smallest particle or foreign material can cause fouling of these devices, because these devices have very tiny orifices and/or a long tortuous narrow passageway that provide the requisite pressure for delivery of precise amounts of water in a uniform manner to each plant in the crop being irrigated.

The addition of fertilizers or other materials, for instance soil amendments, to the micro-irrigation water increases the loading of inorganic salts over that already in the water. When the loading, or the combined loading, is too high, the solubilities of at least some of the naturally-occurring minerals and/or added compounds are exceeded and particulate formation increases dramatically. When particulates form, significant deposits begin to build up throughout the entire micro-irrigation system. The end result is plugging of the emitters or micro-sprinklers. Plugging results in uneven distribution of water and nutrients to the crop being irrigated. In some cases, complete shut-down of the irrigation system occurs. Therefore problem-free use of additives such as fertilizers and/or soil amendments and the like in micro-irrigation systems is conventionally limited to the systems that use relatively pure water sources. When the water source is not relatively pure, the fertilizer or soil amendment is often distributed to the crop by means other than through the irrigation system, with the loss of "fertigation" benefits.

It is an object of the invention to provide stable, non-plugging, concentrated fertilizer/amendment formulations that can be used in drip irrigation systems even though they are being added to irrigation systems using impure, naturally-occurring waters. The term "micro-irrigation" as used herein and in the claims refers to microsprinklers, drip, and subsurface drip systems. It is an object of the invention to provide affordable concentrated fertilizer/amendment solutions comprising cost-effective additives that act synergistically, stabilizing the naturally-occurring water and fertilizer/amendment matrix.

Another object of the invention is to provide mixtures or combinations of naturally-occurring water plus fertilizer/amendment formulations that are stable for prolonged periods of time. This is important since once an irrigation system is shut down and the fertilizer is not flushed from the irrigation system, plugging may happen over time since all the water does not drain out of the irrigation system. A further object of the invention is to provide fertilizer/amendment formulations that aid in modification of the soil such that plant nutrients are more readily available to the crop being irrigated. These and other objects of the invention will be seen below.

SUMMARY OF THE INVENTION

The present invention provides a fortified micro-irrigation system fertilizer formulation which includes a phosphate fertilizer, a water-soluble organic acid and a water-soluble phosphonate, and a micro-irrigation system additive formulation which includes a water-soluble organic acid and a water-soluble phosphonate. The present invention also provides a stable, fortified micro-irrigation water which includes natural-source water and an effective amount of natural-source water additive, which additive includes a water-soluble organic acid and a water-soluble phosphonate.

The present invention also provides a method of simultaneous micro-irrigation and fertilization of agricultural soil without plugging of a micro-irrigation system, which includes the steps of adding a sufficient amount of fortified fertilizer formulation comprising a phosphate fertilizer, a water-soluble organic acid and a water-soluble phosphonate to irrigation water, and then feeding said irrigation water to the micro-irrigation system and then allowing the micro-irrigation system to deliver the irrigation water to agricultural soil.

The present invention also provides a method of preventing plugging of a micro-irrigation system which has phosphate fertilizer in its irrigation water, which includes the step of adding a sufficient amount of an additive comprising a water-soluble organic acid and a water-soluble phosphonate to the irrigation water upstream of the addition of phosphate fertilizer.

The present invention also provides a method of simultaneous micro-irrigation and amendment of agricultural soil using a micro-irrigation system which includes the steps of adding a sufficient amount of an additive comprising a water-soluble organic acid and a water-soluble phosphonate to irrigation water, and then feeding the irrigation water to the micro-irrigation system, and then allowing the micro-irrigation system to deliver the irrigation water to the agricultural soil.

The present invention also provides a process for feeding enhanced irrigation water to micro-irrigation systems comprising the addition of water-soluble phosphonate and water-soluble, low-molecular weight organic acid as fertilizer concentrates that also contain amendment attributes, to naturally-occurring water, to prevent precipitate or deposit formations despite the inclusion of the fertilizer additive, and thus prevent plugging of the irrigation system. The present invention is also a unique fertilizer/amendment/additive formulation that provides a non-plugging approach to the addition of fertilizer formulations that also possess amendment attributes to naturally-occurring water used through micro-irrigation systems.

The present invention in particular provides (1) an irrigation system cleaning formulation comprising an aqueous cleaning-formulation solution containing a sufficient concentration of a water-soluble organic acid, wherein the water soluble-organic acid has a pK(1)a of less than about 4.0, (2) a cleansing irrigation water containing a sufficient amount of such cleaning formulation, and (3) a method of cleaning an irrigation system using such cleaning formulation.

BRIEF DESCRIPTION OF THE SEVERAL VIEWS OF THE DRAWINGS

FIG. 1 is a graphic presentation of elution rates of water volumes up to 200 ml illustrating for comparison the elution rate of water containing 140 ppm hardness and 125 ppm alkalinity, the elution rate of the same water with a 0-21-0 fertilizer, and the elution rate of the same water and fertilizer with a treatment additive of the present invention.

FIG. 2 is a graphic presentation of elution rates of water volumes up to 200 ml illustrating for comparison the elution rate of water containing 140 ppm hardness and 125 ppm alkalinity, the elution rate of the same water with a 7-21-0 fertilizer, the elution rate of the same water and fertilizer with a treatment additive of the present invention, and the elution rate of a commercial 7-21-0 fertilizer with humic acid.

FIG. 3 is a bar-graph type of graphic presentation of the hardness eluted with the treated and untreated elution samples illustrated in FIGS. 1 and 2.

DETAILED DESCRIPTION OF THE INVENTION

Most naturally-occurring waters contain dissolved minerals that by themselves can cause plugging in micro-irrigation systems. The irrigation water to be used in micro-irrigation systems should be carefully evaluated to assess any potential for plugging or clogging problems. Water constituents such as calcium, magnesium, alkalinity, iron, manganese, sulfates, and sulfide can precipitate to clog emitter flow, causing plugging. Water bicarbonate alkalinity concentrations exceeding about 2 meq/liter (200 ppm as $CaCO_3$) can cause calcium carbonate precipitation. Calcium concentrations exceeding 2-3 meq/liter (100-150 ppm as $CaCO_3$) can cause precipitates to form during the injection of phosphate fertilizers. The Solubility Chart below provides an overview of inorganic anion/cation incompatibilities, that is, anions and cations that, when both are present, lead to insoluble inorganic salt formation that can cause plugging in micro-irrigation systems.

CHART 1

Solubility Chart For Common Irrigation-Systems Anions And Cations

| Cation | Anion | | | | | | | |
|---|---|---|---|---|---|---|---|---|
| | $Cl^-$ | $HCO_3^-$ | $OH^-$ | $NO_3^-$ | $CO_3^{-2}$ | $SO_4^{-2}$ | $S^{-2}$ | $PO_4^{-3}$ |
| $Na^+$ | S | S | S | S | S | S | S | S |
| $K^+$ | S | S | S | S | S | S | S | S |
| $NH_4^+$ | S | S | S | S | S | S | S | S |
| $H^+$ | S | S | $H_2O$ | S | $CO_2$ | S | $H_2S$ | S |
| $Ca^{+2}$ | S | SS | VSS | S | I | VSS | XXX | I |
| $Mg^{+2}$ | S | S | I | S | VSS | S | XXX | I |
| $Fe^{+2}$ | S | SS | VSS | S | VSS | S | I | I |
| $Fe^{+3}$ | S | I | I | S | I | S | XXX | I |
| $Mn^{+2}$ | S | XXX | I | S | I | S | I | I |

In Chart 1, S means soluble (over 5,000 ppm), SS means slightly soluble (2,000 to 5,000 ppm), VSS means very slightly soluble (20-2,000 ppm), I means insoluble (<20 ppm) and XXX means does not form (is not a compound). From Kemmer, Frank N., *Water: The Universal Solvent*, Basic Chemistry, p. 37, Nalco Chemical Company 1977.

As seen from the solubility information in Chart 1, the addition of phosphates, such as phosphate fertilizers, to naturally-occurring waters that contain hardness (calcium or magnesium) can cause precipitation that would result in plugging of micro-irrigation systems. To eliminate the potential plugging of the micro-irrigation system, without eliminating the beneficial inclusion of fertilizer therein, the present invention provides a synergistic mixture of water-soluble phosphonate and water-soluble, low-molecular weight organic acid that stabilizes the water-fertilizer matrix. Additionally, the combination of the water-soluble phosphonate and the water-soluble organic acid, when added to the fertilizer, acts as a soil amendment for sodic soils with poor water penetration.

In preferred embodiments of the invention, the water-soluble phosphonate is an aliphatic phosphonate which contains from 1-12 carbon atoms and from 1-3 phosphonate groups.

The phosphonate may be selected from a group of compounds shown below as Formulas I, II and III.

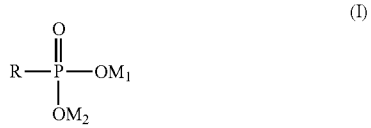

wherein R is $C_{1-6}$ substituted or unsubstituted lower alkyl or a substituted or unsubstituted mononuclear aryl, and wherein $M_1$ and $M_2$ independently are hydrogen or a water-soluble cation.

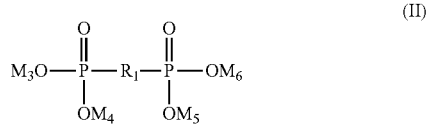

wherein $R_1$ is a $C_{1-12}$ substituted or unsubstituted alkylene, and wherein $M_3$, $M_4$, $M_5$, and $M_6$ independently are hydrogen or a water-soluble cation.

wherein $R_2$ is a $C_{1-4}$ substituted or unsubstituted alkylene wherein the substituents are selected from the group consisting of amine and hydroxy, wherein $R_3$ is selected from the group consisting of $[—R_2PO(OM_9)(OM_{10})]$, H, OH, amino, substituted amino, $C_{1-6}$ substituted or unsubstituted alkyl radical, substituted mononuclear aromatic radical and unsubstituted mononuclear aromatic radical, wherein $R_4$ is $R_3$ or the group shown in Formula IV

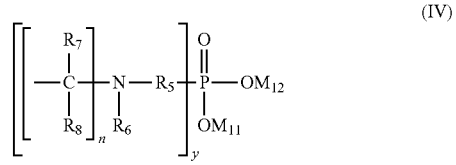

wherein $R_7$ and $R_8$ are independently selected from the group consisting of H, $C_{1-6}$ hydroxyl or amino substituted or unsubstituted lower alkyl, hydrogen, hydroxyl, amino, substituted amino, a mononuclear radical, a hydroxyl or amino substituted mononuclear radical, wherein $R_6$ is H or $C_{1-6}$ lower alkyl, wherein $R_5$ is $R_7$, $R_8$ or the group $[—R_2PO(OM_{13})(OM_{14})]$, wherein y is a number from about 1 through about 14, and n is a number of from 1 to about 15;

wherein $M_3$, $M_4$, $M_5$, $M_6$ $M_7$, $M_8$, $M_9$, $M_{10}$, $M_{11}$, $M_{12}$, $M_{13}$, and $M_{14}$ independently are water soluble cations selected from the group consisting of hydrogen, sodium, potassium, ammonium and lithium.

Specific examples of compounds which are encompassed by Formula I include methylphosphonic acid, ethylphosphonic acid, 2-hydroxyethylphosphonic acid, 2-aminoethylphosphonic acid, isopropylphosphonic acid, benzene phosphonic acid, benzylphosphonic acid, and 2-phosphonobutane-1,2,4-tricarboxylic acid.

Specific examples of compounds which are encompassed by Formula II include methylene diphosphonic acid, ethylidene diphosphonic acid, isopropylidene diphosphonic acid, 1-hydroxy ethylidene diphosphonic acid (HEDP), 1-hydroxyethane-1,1-diphosphonic acid, hexamethylene diphosphonic acid, trimethylene diphosphonic acid, decamethylene diphosphonic acid, 1-hydroxy propylidene diphosphonic acid, 1,6-dihydroxy 1,6-dimethyl hexamethylene diphosphonic acid, and dihydroxy diethyl ethylene diphosphonic acid.

Compounds which can be considered exemplary for Formula III include amino-tri(methylene phosphonic acid) (ATMP), imino-di(methylene phosphonic acid), n-butylamino di(methylene phosphonic acid), decyl-amino-di(methylene phosphonic acid), trisodium-pentadecyl-amino-dimethylphosphate, n-butyl-amino-di(ethylphosphonic acid), tetrasodium-n-butyl-amino-di(methylphosphonate), triammonium tetradecyl-amino-di(methylphosphonate), phenyl-amino-di(methyl phosphonic acid), 4-hydroxy-phenyl-amino-di(methyl phosphonic acid), phenyl propyl amino-di (methyl phosphonic acid), tetrasodium phenyl ethyl amino-di(methyl phosphonic acid), ethylene diamine tetra(methyl phosphonic acid), trimethylene diamine tetra(methyl phosphonic acid), heptamethylene diamine tetra(methyl phosphonic acid), decamethylene diamine tetra (methyl phosphonic acid), tetradecamethylene diamine tetra(methyl phosphonic acid), ethylene diamine tri(methyl phosphonic acid), ethylene diamine di(methyl phosphonic acid), n-hexyl amine di(methyl phosphonic acid), diethylene triamine penta(methyl phosphonic acid), ethanol amine di(methyl phosphonic acid), n-hexyl-amino(isopropylidene phosphonic acid)methylphosphonic acid, trihydroxy methyl methyl amino di(methyl phosphonic acid), triethylene tetraamine hexa(methyl phosphonic acid), monoethanol diethylene triamine tri(methyl phosphonic acid), and chloroethylene amine di(methyl phosphonic acid).

In the preferred embodiment, the water-soluble organic acid is an aliphatic or olefinic carboxylic acid having from about 1-8 carbon atoms and 1-3 carboxylic groups and the water-soluble phosphonate is a phosphonate which contains from about 1-12 carbon atoms and from 1-3 phosphonate groups.

The organic acids may be selected from a group of compounds shown below as Formulas V and VI

wherein $R_{10}$ is a hydrogen, lower alkyl having about one to six carbon atoms (e.g. methyl, ethyl, propyl, isopropyl, butyl, isobutyl, pentyl, isopentyl, and hexyl) or substituted lower alkyl having about one to six carbon atoms, (e.g. lower alkyl substituted with hydroxyl, amino, aceto, cyano, anhydride, and carboxylic acids and salts of carboxylic acids ($—COOM_{21}$) wherein $M_{20}$ and $M_{21}$ are each water-soluble cations such as, independently, hydrogen, ammonium, lithium, sodium, or potassium, $$(R_{11})(R_{12})C=C(R_{13})COOM_{22} \quad (VI)$$

where $R_{11}$, $R_{12}$ and $R_{13}$ are independently selected from the group consisting of hydrogen, $C_{1-6}$ lower alkyl (such as methyl, ethyl, propyl, isopropyl, butyl, isobutyl, pentyl, isopentyl, and hexyl) and substituted $C_{1-6}$ lower alkyl wherein the substituents are selected from the group consisting of hydroxyl, amino, aceto, cyano, anhydride, carboxylic acid and salts ($—COOM_{23}$) and wherein $M_{22}$ and $M_{23}$ are independently water-soluble cations selected from the group consisting of hydrogen, ammonium, lithium, sodium, or potassium.

Specific examples of compounds that are encompassed by Formula V include, without limitation: formic acid, acetic acid, propionic acid, n-butyric acid, iso-butyric acid, caproic acid, iso-caproic acid, acetoacetic acid, adipic acid, alanine, glycine, aspartic acid, citric acid, malic acid, acetic anhydride, malonic acid, oxalic acid, succinic acid, tartaric acid, valeric acid, cyanoacetic acid, cyanopropionic acid, cyanobutyric acid, dihydroxytartaric acid, glutaric acid, gycolic acid, hydroxybutyric acid, hydroxypropionic acid, and lactic acid.

Specific examples of compounds that are encompassed by Formula VI include, without limitation: acrylic acid, ascorbic acid, crotonic acid, dihydroxymaleic acid, fumaric acid, filmic acid, itaconic acid, and mesaconic acid.

EXAMPLES

The efficacy of the present invention is illustrated in the data set forth in Tables 1 through 15. In more detail, to demonstrate the efficacies of the formulations of the present invention in eliminating the plugging potential in micro-irrigation systems, formulations with varying levels of fertilizers, and with and without varying levels of the water-soluble phosphonate and/or the water-soluble organic acid, were prepared, and then added to various concentrations of hard-alkaline water to determine if precipitation occurred. The fertilizer types (by NPK, wherein N is the amount of nitrogen as N, P is the amount of phosphorus as $P_2O_5$ and K is the amount of potassium as $K_2O$) and levels (in weight percent based on weight of water), the water impurity levels (in ppm of total alkalinity and total hardness, both in terms of $CaCO_3$, or "Test 1" or "Test 2" water described below), the organic acid types and levels (in weight percent based on weight of water), the phosphonate types and levels (in weight percent based on weight of water), and the resultant precipitation determined as water turbidity in Nephlometric Turbidity Units (NTU), are set forth in Tables 1-15. In addition, the following abbreviations are used in Tables 1-15: ATMP stands for amino-tri(methylene phosphoric acid), HEDP stands for 1-hydroxyethylidene-1,1-diphosphonic acid.

TABLE 1

Stability of Water and Fertilizer, With and Without Treatment
Effect of Phosphonates and Organic Acids

| Fertilizer Type (NPK) | Fertilizer Level (wt. %) | Water Impurity Level (ppm) | Treatment A Organic Acid Level (ppm) | Treatment A Organic Acid Type | Treatment B Phosphonate Level (ppm) | Treatment B Phosphonate Type | Turbidity (NTU) |
|---|---|---|---|---|---|---|---|
| None | 0.0 | 1,000 | 0 | None | 0 | None | 2 |
| 0-21-0 | 1.0 | 1,000 | 0 | None | 0 | None | 344 |
| 0-21-0 | 1.0 | 1,000 | 700 | Formic | 100 | ATMP | 2 |
| 0-21-0 | 1.0 | 1,000 | 700 | Acetic | 100 | ATMP | 3 |

TABLE 1-continued

Stability of Water and Fertilizer, With and Without Treatment
Effect of Phosphonates and Organic Acids

| Fertilizer Type (NPK) | Fertilizer Level (wt. %) | Water Impurity Level (ppm) | Treatment A Organic Acid Level (ppm) | Treatment A Organic Acid Type | Treatment B Phosphonate Level (ppm) | Treatment B Phosphonate Type | Turbidity (NTU) |
|---|---|---|---|---|---|---|---|
| 0-21-0 | 1.0 | 1,000 | 700 | Prop. | 100 | ATMP | 2 |
| 0-21-0 | 1.0 | 1,000 | 700 | Maleic | 100 | ATMP | 2 |
| 0-21-0 | 1.0 | 1,000 | 700 | Citric | 100 | ATMP | 2 |
| 0-21-0 | 1.0 | 1,000 | 700 | Formic | 100 | HEDP | 2 |
| 0-21-0 | 1.0 | 1,000 | 700 | Acetic | 100 | HEDP | 2 |
| 0-21-0 | 1.0 | 1,000 | 700 | Prop. | 100 | HEDP | 2 |
| 0-21-0 | 1.0 | 1,000 | 700 | Maleic | 100 | HEDP | 2 |
| 0-21-0 | 1.0 | 1,000 | 700 | Citric | 100 | HEDP | 2 |

TABLE 2

Stability of Water and Fertilizer, With and Without Treatment
Effect of Phosphonates and Organic Acids

| Fertilizer Type (NPK) | Fertilizer Level (wt. %) | Water Impurity Level (ppm) | Treatment A Organic Acid Level (ppm) | Treatment A Organic Acid Type | Treatment B Phosphonate Level (ppm) | Treatment B Phosphonate Type | Turbidity (NTU) |
|---|---|---|---|---|---|---|---|
| None | 0.0 | 1,000 | 0 | None | 0 | None | 2 |
| 7-21-0 | 1.0 | 1,000 | 0 | None | 0 | None | 252 |
| 7-21-0 | 1.0 | 1,000 | 700 | Formic | 100 | ATMP | 2 |
| 7-21-0 | 1.0 | 1,000 | 700 | Acetic | 100 | ATMP | 2 |
| 7-21-0 | 1.0 | 1,000 | 700 | Prop. | 100 | ATMP | 3 |
| 7-21-0 | 1.0 | 1,000 | 700 | Maleic | 100 | ATMP | 2 |
| 7-21-0 | 1.0 | 1,000 | 700 | Citric | 100 | ATMP | 2 |
| 7-21-0 | 1.0 | 1,000 | 700 | Formic | 100 | HEDP | 2 |
| 7-21-0 | 1.0 | 1,000 | 700 | Acetic | 100 | HEDP | 2 |
| 7-21-0 | 1.0 | 1,000 | 700 | Prop. | 100 | HEDP | 2 |
| 7-21-0 | 1.0 | 1,000 | 700 | Maleic | 100 | HEDP | 2 |
| 7-21-0 | 1.0 | 1,000 | 700 | Citric | 100 | HEDP | 3 |

TABLE 3

Stability of Water and Fertilizer, With and Without Treatment
Various Concentrations of Fertilizer,
Phosphonate and Organic Acid; Differing Water Quality

| Fertilizer Type (NPK) | Fertilizer Level (wt. %) | Water Impurity Level (ppm) | Treatment A Organic Acid Level (ppm) | Treatment A Organic Acid Type | Treatment B Phosphonate Level (ppm) | Treatment B Phosphonate Type | Turbidity (NTU) |
|---|---|---|---|---|---|---|---|
| None | 0.0 | 1,000 | 0 | None | 0 | None | 2 |
| 0-21-0 | 1.0 | 1,000 | 0 | None | 0 | None | 344 |
| 0-21-0 | 1.0 | 1,000 | 700 | Formic | 100 | ATMP | 2 |
| 0-21-0 | 1.0 | 1,000 | 700 | Acetic | 100 | ATMP | 3 |
| 0-21-0 | 1.0 | 1,000 | 700 | Formic | 100 | HEDP | 2 |
| 0-21-0 | 1.0 | 1,000 | 700 | Acetic | 100 | HEDP | 2 |
| None | 0.0 | 500 | 0 | None | 0 | None | 2 |
| 0-21-0 | 1.0 | 500 | 0 | None | 0 | None | 174 |
| 0-21-0 | 1.0 | 500 | 700 | Formic | 100 | ATMP | 2 |
| 0-21-0 | 1.0 | 500 | 700 | Acetic | 100 | ATMP | 2 |
| 0-21-0 | 1.0 | 500 | 700 | Formic | 100 | HEDP | 2 |
| 0-21-0 | 1.0 | 500 | 700 | Acetic | 100 | HEDP | 2 |
| 0-21-0 | 0.1 | 500 | 0 | None | 0 | None | 98 |
| 0-21-0 | 0.1 | 500 | 70 | Formic | 10 | ATMP | 2 |
| 0-21-0 | 0.1 | 500 | 70 | Acetic | 10 | ATMP | 2 |
| 0-21-0 | 0.1 | 500 | 70 | Formic | 10 | HEDP | 2 |
| 0-21-0 | 0.1 | 500 | 70 | Acetic | 10 | HEDP | 3 |
| None | 0.0 | 250 | 0 | None | 0 | None | 2 |
| 0-21-0 | 0.1 | 250 | 0 | None | 0 | None | 36 |
| 0-21-0 | 0.1 | 250 | 70 | Formic | 10 | ATMP | 2 |
| 0-21-0 | 0.1 | 250 | 70 | Acetic | 10 | ATMP | 2 |

TABLE 3-continued

Stability of Water and Fertilizer, With and Without Treatment
Various Concentrations of Fertilizer,
Phosphonate and Organic Acid; Differing Water Quality

| Fertilizer Type (NPK) | Fertilizer Level (wt. %) | Water Impurity Level (ppm) | Treatment A Organic Acid | | Treatment B Phosphonate | | Turbidity (NTU) |
|---|---|---|---|---|---|---|---|
| | | | Level (ppm) | Type | Level (ppm) | Type | |
| 0-21-0 | 0.1 | 250 | 70 | Formic | 10 | HEDP | 2 |
| 0-21-0 | 0.1 | 250 | 70 | Acetic | 10 | HEDP | 2 |
| None | 0.0 | 125 | 0 | None | 0 | None | 2 |
| 0-21-0 | 0.02 | 125 | 0 | None | 0 | None | 23 |
| 0-21-0 | 0.02 | 125 | 14 | Formic | 2 | ATMP | 2 |
| 0-21-0 | 0.02 | 125 | 14 | Acetic | 2 | ATMP | 2 |
| 0-21-0 | 0.02 | 125 | 14 | Formic | 2 | HEDP | 2 |
| 0-21-0 | 0.02 | 125 | 14 | Acetic | 2 | HEDP | 2 |

TABLE 4

Stability of Water and Fertilizer, With and Without Treatment
Various Concentrations of Fertilizer,
Phosphonate and Organic Acid; Differing Water Quality

| Fertilizer Type (NPK) | Fertilizer Level (wt. %) | Water Impurity Level (ppm) | Treatment A Organic Acid | | Treatment B Phosphonate | | Turbidity (NTU) |
|---|---|---|---|---|---|---|---|
| | | | Level (ppm) | Type | Level (ppm) | Type | |
| None | 0.0 | 1,000 | 0 | None | 0 | None | 2 |
| 7-21-0 | 1.0 | 1,000 | 0 | None | 0 | None | 252 |
| 7-21-0 | 1.0 | 1,000 | 700 | Formic | 100 | ATMP | 2 |
| 7-21-0 | 1.0 | 1,000 | 700 | Acetic | 100 | ATMP | 2 |
| 7-21-0 | 1.0 | 1,000 | 700 | Formic | 100 | HEDP | 2 |
| 7-21-0 | 1.0 | 1,000 | 700 | Acetic | 100 | HEDP | 2 |
| None | 0.0 | 500 | 0 | None | 0 | None | 2 |
| 7-21-0 | 1.0 | 500 | 0 | None | 0 | None | 105 |
| 7-21-0 | 1.0 | 500 | 700 | Formic | 100 | ATMP | 2 |
| 7-21-0 | 1.0 | 500 | 700 | Acetic | 100 | ATMP | 2 |
| 7-21-0 | 1.0 | 500 | 700 | Formic | 100 | HEDP | 2 |
| 7-21-0 | 1.0 | 500 | 700 | Acetic | 100 | HEDP | 2 |
| 7-21-0 | 0.1 | 500 | 0 | None | 0 | None | 206 |
| 7-21-0 | 0.1 | 500 | 70 | Formic | 10 | ATMP | 2 |
| 7-21-0 | 0.1 | 500 | 70 | Acetic | 10 | ATMP | 2 |
| 7-21-0 | 0.1 | 500 | 70 | Formic | 10 | HEDP | 2 |
| 7-21-0 | 0.1 | 500 | 70 | Acetic | 10 | HEDP | 2 |
| None | 0.0 | 250 | 0 | None | 0 | None | 2 |
| 7-21-0 | 0.1 | 250 | 0 | None | 0 | None | 80 |
| 7-21-0 | 0.1 | 250 | 70 | Formic | 10 | ATMP | 2 |
| 7-21-0 | 0.1 | 250 | 70 | Acetic | 10 | ATMP | 2 |
| 7-21-0 | 0.1 | 250 | 70 | Formic | 10 | HEDP | 2 |
| 7-21-0 | 0.1 | 250 | 70 | Acetic | 10 | HEDP | 2 |
| None | 0.0 | 125 | 0 | None | 0 | None | 2 |
| 7-21-0 | 0.02 | 125 | 0 | None | 0 | None | 31 |
| 7-21-0 | 0.02 | 125 | 14 | Formic | 2 | ATMP | 2 |
| 7-21-0 | 0.02 | 125 | 14 | Acetic | 2 | ATMP | 2 |
| 7-21-0 | 0.02 | 125 | 14 | Formic | 2 | HEDP | 3 |
| 7-21-0 | 0.02 | 125 | 14 | Acetic | 2 | HEDP | 2 |

TABLE 5

Stability of Water and Fertilizer, With and Without Treatment
Synergistic Effect of Phosphonate and Organic Acid

| Fertilizer Type (NPK) | Fertilizer Level (wt. %) | Water Impurity Level (ppm) | Treatment A Organic Acid | | Treatment B Phosphonate | | Turbidity (NTU) |
|---|---|---|---|---|---|---|---|
| | | | Level (ppm) | Type | Level (ppm) | Type | |
| None | 0.0 | 500 | 0 | None | 0 | None | 2 |
| 0-21-0 | 0.1 | 500 | 0 | None | 0 | None | 98 |
| 0-21-0 | 0.1 | 500 | 70 | Formic | 0 | None | 55 |
| 0-21-0 | 0.1 | 500 | 0 | None | 10 | ATMP | 63 |
| 0-21-0 | 0.1 | 500 | 70 | Formic | 10 | ATMP | 2 |
| None | 0.0 | 250 | 0 | None | 0 | None | 2 |
| 0-21-0 | 0.1 | 250 | 0 | None | 0 | None | 36 |
| 0-21-0 | 0.1 | 250 | 70 | Formic | 0 | None | 15 |
| 0-21-0 | 0.1 | 250 | 0 | None | 10 | ATMP | 18 |
| 0-21-0 | 0.1 | 250 | 70 | Formic | 10 | ATMP | 2 |

TABLE 6

Stability of Water and Fertilizer, With and Without Treatment
Synergistic Effect of Phosphonate and Organic Acid

| Fertilizer Type (NPK) | Fertilizer Level (wt. %) | Water Impurity Level (ppm) | Treatment A Organic Acid | | Treatment B Phosphonate | | Turbidity (NTU) |
|---|---|---|---|---|---|---|---|
| | | | Level (ppm) | Type | Level (ppm) | Type | |
| None | 0.0 | 500 | 0 | None | 0 | None | 2 |
| 0-21-0 | 0.1 | 500 | 0 | None | 0 | None | 98 |
| 0-21-0 | 0.1 | 500 | 70 | Acetic | 0 | None | 49 |
| 0-21-0 | 0.1 | 500 | 0 | None | 10 | ATMP | 63 |
| 0-21-0 | 0.1 | 500 | 70 | Acetic | 10 | ATMP | 2 |
| None | 0.0 | 250 | 0 | None | 0 | None | 2 |
| 0-21-0 | 0.1 | 250 | 0 | None | 0 | None | 36 |
| 0-21-0 | 0.1 | 250 | 70 | Acetic | 0 | None | 12 |
| 0-21-0 | 0.1 | 250 | 0 | None | 10 | ATMP | 18 |
| 0-21-0 | 0.1 | 250 | 70 | Acetic | 10 | ATMP | 2 |

TABLE 7

Stability of Water and Fertilizer, With and Without Treatment
Synergistic Effect of Phosphonate and Organic Acid

| Fertilizer Type (NPK) | Fertilizer Level (wt. %) | Water Impurity Level (ppm) | Treatment A Organic Acid | | Treatment B Phosphonate | | Turbidity (NTU) |
|---|---|---|---|---|---|---|---|
| | | | Level (ppm) | Type | Level (ppm) | Type | |
| None | 0.0 | 500 | 0 | None | 0 | None | 2 |
| 0-21-0 | 0.1 | 500 | 0 | None | 0 | None | 98 |
| 0-21-0 | 0.1 | 500 | 70 | Formic | 0 | None | 55 |
| 0-21-0 | 0.1 | 500 | 0 | None | 10 | HEDP | 59 |
| 0-21-0 | 0.1 | 500 | 70 | Formic | 10 | HEDP | 2 |
| None | 0.0 | 250 | 0 | None | 0 | None | 2 |
| 0-21-0 | 0.1 | 250 | 0 | None | 0 | None | 36 |
| 0-21-0 | 0.1 | 250 | 70 | Formic | 0 | None | 15 |
| 0-21-0 | 0.1 | 250 | 0 | None | 10 | HEDP | 14 |
| 0-21-0 | 0.1 | 250 | 70 | Formic | 10 | HEDP | 2 |

TABLE 8

Stability of Water and Fertilizer, With and Without Treatment
Synergistic Effect of Phosphonate and Organic Acid

| Fertilizer Type (NPK) | Fertilizer Level (wt. %) | Water Impurity Level (ppm) | Treatment A Organic Acid | | Treatment B Phosphonate | | Turbidity (NTU) |
|---|---|---|---|---|---|---|---|
| | | | Level (ppm) | Type | Level (ppm) | Type | |
| None | 0.0 | 500 | 0 | None | 0 | None | 2 |
| 0-21-0 | 0.1 | 500 | 0 | None | 0 | None | 98 |

TABLE 8-continued

Stability of Water and Fertilizer, With and Without Treatment
Synergistic Effect of Phosphonate and Organic Acid

| Fertilizer Type (NPK) | Fertilizer Level (wt. %) | Water Impurity Level (ppm) | Treatment A Organic Acid Level (ppm) | Type | Treatment B Phosphonate Level (ppm) | Type | Turbidity (NTU) |
|---|---|---|---|---|---|---|---|
| 0-21-0 | 0.1 | 500 | 70 | Acetic | 0 | None | 49 |
| 0-21-0 | 0.1 | 500 | 0 | None | 10 | HEDP | 59 |
| 0-21-0 | 0.1 | 500 | 70 | Acetic | 10 | HEDP | 2 |
| None | 0.0 | 250 | 0 | None | 0 | None | 2 |
| 0-21-0 | 0.1 | 250 | 0 | None | 0 | None | 36 |
| 0-21-0 | 0.1 | 250 | 70 | Acetic | 0 | None | 12 |
| 0-21-0 | 0.1 | 250 | 0 | None | 10 | HEDP | 14 |
| 0-21-0 | 0.1 | 250 | 70 | Acetic | 10 | HEDP | 3 |

TABLE 9

Stability of Water and Fertilizer, With and Without Treatment
Synergistic Effect of Phosphonate and Organic Acid

| Fertilizer Type (NPK) | Fertilizer Level (wt. %) | Water Impurity Level (ppm) | Treatment A Organic Acid Level (ppm) | Type | Treatment B Phosphonate Level (ppm) | Type | Turbidity (NTU) |
|---|---|---|---|---|---|---|---|
| None | 0.0 | 500 | 0 | None | 0 | None | 2 |
| 7-21-0 | 0.1 | 500 | 0 | None | 0 | None | 206 |
| 7-21-0 | 0.1 | 500 | 70 | Formic | 0 | None | 129 |
| 7-21-0 | 0.1 | 500 | 0 | None | 10 | ATMP | 138 |
| 7-21-0 | 0.1 | 500 | 70 | Formic | 10 | ATMP | 2 |
| None | 0.0 | 250 | 0 | None | 0 | None | 2 |
| 7-21-0 | 0.1 | 250 | 0 | None | 0 | None | 80 |
| 7-21-0 | 0.1 | 250 | 70 | Formic | 0 | None | 36 |
| 7-21-0 | 0.1 | 250 | 0 | None | 10 | ATMP | 34 |
| 7-21-0 | 0.1 | 250 | 70 | Formic | 10 | ATMP | 2 |

TABLE 10

Stability of Water and Fertilizer, With and Without Treatment
Synergistic Effect of Phosphonate and Organic Acid

| Fertilizer Type (NPK) | Fertilizer Level (wt. %) | Water Impurity Level (ppm) | Treatment A Organic Acid Level (ppm) | Type | Treatment B Phosphonate Level (ppm) | Type | Turbidity (NTU) |
|---|---|---|---|---|---|---|---|
| None | 0.0 | 500 | 0 | None | 0 | None | 2 |
| 7-21-0 | 0.1 | 500 | 0 | None | 0 | None | 206 |
| 7-21-0 | 0.1 | 500 | 70 | Acetic | 0 | None | 140 |
| 7-21-0 | 0.1 | 500 | 0 | None | 10 | ATMP | 138 |
| 7-21-0 | 0.1 | 500 | 70 | Acetic | 10 | ATMP | 2 |
| None | 0.0 | 250 | 0 | None | 0 | None | 2 |
| 7-21-0 | 0.1 | 250 | 0 | None | 0 | None | 80 |
| 7-21-0 | 0.1 | 250 | 70 | Acetic | 0 | None | 38 |
| 7-21-0 | 0.1 | 250 | 0 | None | 10 | ATMP | 34 |
| 7-21-0 | 0.1 | 250 | 70 | Acetic | 10 | ATMP | 2 |

TABLE 11

Stability of Water and Fertilizer, With and Without Treatment
Synergistic Effect of Phosphonate and Organic Acid

| Fertilizer Type (NPK) | Fertilizer Level (wt. %) | Water Impurity Level (ppm) | Treatment A Organic Acid Level (ppm) | Type | Treatment B Phosphonate Level (ppm) | Type | Turbidity (NTU) |
|---|---|---|---|---|---|---|---|
| None | 0.0 | 500 | 0 | None | 0 | None | 2 |
| 7-21-0 | 0.1 | 500 | 0 | None | 0 | None | 206 |
| 7-21-0 | 0.1 | 500 | 70 | Formic | 0 | None | 129 |
| 7-21-0 | 0.1 | 500 | 0 | None | 10 | HEDP | 143 |
| 7-21-0 | 0.1 | 500 | 70 | Formic | 10 | HEDP | 2 |
| None | 0.0 | 250 | 0 | None | 0 | None | 2 |
| 7-21-0 | 0.1 | 250 | 0 | None | 0 | None | 80 |
| 7-21-0 | 0.1 | 250 | 70 | Formic | 0 | None | 36 |
| 7-21-0 | 0.1 | 250 | 0 | None | 10 | HEDP | 34 |
| 7-21-0 | 0.1 | 250 | 70 | Formic | 10 | HEDP | 2 |

TABLE 12

Stability of Water and Fertilizer, With and Without Treatment
Synergistic Effect of Phosphonate and Organic Acid

| Fertilizer Type (NPK) | Fertilizer Level (wt. %) | Water Impurity Level (ppm) | Treatment A Organic Acid Level (ppm) | Type | Treatment B Phosphonate Level (ppm) | Type | Turbidity (NTU) |
|---|---|---|---|---|---|---|---|
| None | 0.0 | 500 | 0 | None | 0 | None | 2 |
| 7-21-0 | 0.1 | 500 | 0 | None | 0 | None | 206 |
| 7-21-0 | 0.1 | 500 | 70 | Acetic | 0 | None | 140 |
| 7-21-0 | 0.1 | 500 | 0 | None | 10 | HEDP | 143 |
| 7-21-0 | 0.1 | 500 | 70 | Acetic | 10 | HEDP | 2 |
| None | 0.0 | 250 | 0 | None | 0 | None | 2 |
| 7-21-0 | 0.1 | 250 | 0 | None | 0 | None | 80 |
| 7-21-0 | 0.1 | 250 | 70 | Acetic | 0 | None | 38 |
| 7-21-0 | 0.1 | 250 | 0 | None | 10 | HEDP | 34 |
| 7-21-0 | 0.1 | 250 | 70 | Acetic | 10 | HEDP | 3 |

TABLE 13

Stability of Water and Fertilizer, With and Without Treatment
Effect of Phosphonate and Organic Acid; Well Water Samples

| Fertilizer Type (NPK) | Fertilizer Level (wt. %) | Water Impurity (Test #) | Treatment A Organic Acid Level (ppm) | Type | Treatment B Phosphonate Level (ppm) | Type | Turbidity (NTU) |
|---|---|---|---|---|---|---|---|
| None | 0.0 | Test 1 | 0 | None | 0 | None | 2 |
| 0-21-0 | 1.0 | Test 1 | 0 | None | 0 | None | 80 |
| 0-21-0 | 1.0 | Test 1 | 700 | Formic | 100 | ATMP | 2 |
| 0-21-0 | 1.0 | Test 1 | 700 | Acetic | 100 | ATMP | 2 |
| 0-21-0 | 1.0 | Test 1 | 700 | Formic | 100 | HEDP | 2 |
| 0-21-0 | 1.0 | Test 1 | 700 | Acetic | 100 | HEDP | 2 |
| 0-21-0 | 0.1 | Test 1 | 0 | None | 0 | None | 50 |
| 0-21-0 | 0.1 | Test 1 | 70 | Formic | 10 | ATMP | 2 |
| 0-21-0 | 0.1 | Test 1 | 70 | Acetic | 10 | ATMP | 2 |
| 0-21-0 | 0.1 | Test 1 | 70 | Formic | 10 | HEDP | 2 |
| 0-21-0 | 0.1 | Test 1 | 70 | Acetic | 10 | HEDP | 2 |
| 0-21-0 | 0.02 | Test 1 | 0 | None | 0 | None | 34 |
| 0-21-0 | 0.02 | Test 1 | 14 | Formic | 2 | ATMP | 2 |
| 0-21-0 | 0.02 | Test 1 | 14 | Acetic | 2 | ATMP | 2 |
| 0-21-0 | 0.02 | Test 1 | 14 | Formic | 2 | HEDP | 2 |
| 0-21-0 | 0.02 | Test 1 | 14 | Acetic | 2 | HEDP | 2 |

TABLE 14

Stability of Water and Fertilizer, With and Without Treatment
Effect of Phosphonate and Organic Acid; Well Water Samples

| Fertilizer Type (NPK) | Fertilizer Level (wt. %) | Water Impurity Level (Test #) | Treatment A Organic Acid Level (ppm) | Type | Treatment B Phosphonate Level (ppm) | Type | Turbidity (NTU) |
|---|---|---|---|---|---|---|---|
| None | 0.0 | Test 1 | 0 | None | 0 | None | 2 |
| 7-21-0 | 1.0 | Test 1 | 0 | None | 0 | None | 240 |
| 7-21-0 | 1.0 | Test 1 | 700 | Formic | 100 | ATMP | 2 |
| 7-21-0 | 1.0 | Test 1 | 700 | Acetic | 100 | ATMP | 2 |
| 7-21-0 | 1.0 | Test 1 | 700 | Formic | 100 | HEDP | 2 |
| 7-21-0 | 1.0 | Test 1 | 700 | Acetic | 100 | HEDP | 3 |
| 7-21-0 | 0.1 | Test 1 | 0 | None | 0 | None | 158 |
| 7-21-0 | 0.1 | Test 1 | 70 | Formic | 10 | ATMP | 2 |

TABLE 14

Stability of Water and Fertilizer, With and Without Treatment
Effect of Phosphonate and Organic Acid; Well Water Samples

| Fertilizer Type (NPK) | Fertilizer Level (wt. %) | Water Impurity Level (Test #) | Treatment A Organic Acid Level (ppm) | Type | Treatment B Phosphonate Level (ppm) | Type | Turbidity (NTU) |
|---|---|---|---|---|---|---|---|
| 7-21-0 | 0.1 | Test 1 | 70 | Acetic | 10 | ATMP | 2 |
| 7-21-0 | 0.1 | Test 1 | 70 | Formic | 10 | HEDP | 2 |
| 7-21-0 | 0.1 | Test 1 | 70 | Acetic | 10 | HEDP | 3 |
| 7-21-0 | 0.02 | Test 1 | 0 | None | 0 | None | 41 |
| 7-21-0 | 0.02 | Test 1 | 14 | Formic | 2 | ATMP | 2 |
| 7-21-0 | 0.02 | Test 1 | 14 | Acetic | 2 | ATMP | 2 |
| 7-21-0 | 0.02 | Test 1 | 14 | Formic | 2 | HEDP | 2 |
| 7-21-0 | 0.02 | Test 1 | 14 | Acetic | 2 | HEDP | 2 |

The impurity levels that cause water quality problems have been determined on this actual well sample (Test 1) as: Total Hardness=600 ppm as $CaCO_3$, Total Alkalinity=300 ppm as $CaCO_3$, Mn=0.19 ppm as Mn, Fe=0.04 ppm as Fe, $SiO_2$=30 ppm as $SiO_2$, $SO_4$=440 ppm as $SO_4$, Cl=225 ppm as Cl.

TABLE 15

Stability of Water and Fertilizer, With and Without Treatment
Effect of Commercial versus Phosphonate
and Organic Acid; Well Water Samples

| Fertilizer Type (NPK) | Fertilizer Level (wt. %) | Water Impurity Level (Test #) | Treatment A Organic Acid Level (ppm) | Type | Treatment B Phosphonate Level (ppm) | Type | Turbidity (NTU) |
|---|---|---|---|---|---|---|---|
| None | 0.0 | Test 2 | 0 | None | 0 | None | 2 |
| commercial | 1.0 | Test 2 | 0 | None | 0 | None | 4516 |
| 7-21-0 | 1.0 | Test 2 | 700 | Formic | 100 | ATMP | 2 |
| 7-21-0 | 1.0 | Test 2 | 700 | Acetic | 100 | ATMP | 2 |
| 7-21-0 | 1.0 | Test 2 | 700 | Formic | 100 | HEDP | 2 |
| 7-21-0 | 1.0 | Test 2 | 700 | Acetic | 100 | HEDP | 2 |
| commercial | 0.1 | Test 2 | 0 | None | 0 | None | 424 |
| 7-21-0 | 0.1 | Test 2 | 70 | Formic | 10 | ATMP | 2 |
| 7-21-0 | 0.1 | Test 2 | 70 | Acetic | 10 | ATMP | 2 |
| 7-21-0 | 0.1 | Test 2 | 70 | Formic | 10 | HEDP | 2 |
| 7-21-0 | 0.1 | Test 2 | 70 | Acetic | 10 | HEDP | 2 |
| commercial | 0.01 | Test 2 | 0 | None | 0 | None | 24 |

TABLE 15

Stability of Water and Fertilizer, With and Without Treatment
Effect of Commercial versus Phosphonate
and Organic Acid; Well Water Samples

| Fertilizer Type (NPK) | Fertilizer Level (wt. %) | Water Impurity Level (Test #) | Treatment A Organic Acid Level (ppm) | Type | Treatment B Phosphonate Level (ppm) | Type | Turbidity (NTU) |
|---|---|---|---|---|---|---|---|
| 7-21-0 | 0.01 | Test 2 | 7 | Formic | 1 | ATMP | 2 |
| 7-21-0 | 0.01 | Test 2 | 7 | Acetic | 1 | ATMP | 3 |
| 7-21-0 | 0.01 | Test 2 | 7 | Formic | 1 | HEDP | 2 |
| 7-21-0 | 0.01 | Test 2 | 7 | Acetic | 1 | HEDP | 2 |

The impurity levels that cause water quality problems have been determined on this actual well sample (Test 2) as: Total Hardness=600 ppm as $CaCO_3$, Total Alkalinity=300 ppm as $CaCO_3$, Mn=0.08 ppm as Mn, Fe=<0.01 ppm as Fe, $SiO_2$=45 ppm as $SiO_2$, $SO_4$=980 ppm as $SO_4$, Cl=125 ppm as Cl.

The commercial fertilizer used in the comparison is sold under the trade name of Structure by Actagro, LLC. of Biola, Calif., and it is identified in the trade literature as a 7-21-0 fertilizer containing humic acid as a soil amendment.

The data set forth in Tables 16 and 17 below, and in FIG. 1 and FIG. 2, are the results of elution rate tests, using in all instances Fresno, Calif. city water that contains 140 ppm hardness and 125 ppm alkalinity, both as $CaCO_3$. The fertilizer was added at a level of 1.0 weight percent in all instances, except of course the blank. The "Treatment" used in all instances was 700 ppm organic acid and 100 ppm phosphonate. The fertilizer used in the tests shown in Table 16 was a 0-21-0 fertilizer. The fertilizer used in the tests shown in Table 17 was a 7-21-0 fertilizer, and an additional set of tests was conducted for comparison using the humic-acid containing commercial formulation described above.

The sets of data in Tables 1 through 15 above demonstrate the synergistic effect of the water-soluble organic acid, water-soluble phosphonate and phosphate-containing fertilizers in prevention of precipitation of calcium phosphate salts when added to water that is hard and alkaline. The sets of data in Tables 16 through 18 below and in FIG. 1, FIG. 2 and FIG. 3, in which the same data is presented in graphical formats, demonstrate the soil amendment activity, namely a water penetration increase, achieved by passing formulations of the present invention through sodic soil that is very hard and alkaline.

Water penetration, or movement of moisture and air through the soil, is dependent on the porosity of the soil. Good soil porosity (good water penetration) can be measured through divalent cations in the soil. Soils that contain highly mobile or soluble divalent cations such as calcium and magnesium possess good water penetration characteristics.

To demonstrate the soil amendment activities of the present formulations, the various formulations were evaluated in a sodic soil that possessed very poor water penetration characteristics. The features or qualities measured to determine the base-line and post-treatment water penetration properties of the soil were: (1) the rate at which water passes through the soil; and (2) the level of soluble calcium and magnesium cation (hardness) that is available (soluble) when water (treated and untreated) is passed through the soil.

The data shown in Tables 16 and 17 below provide a comparison of the elution rates of the present compositions (fertilizer plus treatment) versus tap water and fertilizer with the same NPK values. The data of Tables 16 and 17 below are the results of elution rate tests, using in all instances Fresno, Calif. city water that contains 140 ppm hardness and 125 ppm alkalinity, both as $CaCO_3$. The fertilizer was added at a level of 1.0 weight percent in all instances, except of course the blank. The "Treatment" used in all instances was 700 ppm organic acid and 100 ppm phosphonate. The fertilizer used in the tests shown in Table 16 was a 0-21-0 fertilizer. The fertilizer used in the tests shown in Table 17 was a 7-21-0 fertilizer, and an additional set of tests were conducted for comparison using the humic-acid containing commercial formulation described above. The fertilizer type is given in terms of NPK, wherein N is the amount of nitrogen as N, P is the amount of phosphorus as $P_2O_5$ and K is the amount of potassium as $K_2O$. FIGS. 1 and 2 are graphs of the data set forth in Tables 16 and 17, respectively.

The data shown in Table 18 below compares the available $Ca^{+2}$ and $Mg^{+2}$ cations (hardness) that are solubilized or made available by the fertilizer/amendment treatment of the present invention compared to the addition of water without the treatment. FIG. 3 is a bar-graph type of graphical presentation of the data set forth in Table 18.

TABLE 16

Elution Rate Comparisons
(Elution Time in min.)

| Water Volume (ml) | Water | Water with Fertilizer | Water with Fertilizer and Treatment |
|---|---|---|---|
| 0 | 0 | 0 | 0 |
| 10 | 72 | 58 | 52 |
| 20 | 122 | 104 | 87 |
| 30 | 172 | 152 | 123 |
| 40 | 229 | 214 | 162 |
| 50 | 287 | 276 | 198 |
| 60 | 361 | 327 | 242 |
| 70 | 400 | 399 | 275 |
| 80 | 458 | 462 | 314 |
| 90 | 537 | 548 | 355 |
| 100 | 591 | 598 | 391 |
| 120 | 733 | 748 | 474 |
| 140 | 878 | 914 | 551 |
| 160 | 1031 | 1065 | 654 |
| 180 | 1182 | 1248 | 758 |
| 200 | 1351 | 1392 | 857 |

TABLE 17

Elution Rate Comparisons
(Elution Time in min.)

| Water Volume (ml) | Water | Water with Fertilizer | Water with Fertilizer and Treatment | Water with Commercial Formulation |
|---|---|---|---|---|
| 0 | 0 | 0 | 0 | 0 |
| 10 | 72 | 62 | 52 | 61 |
| 20 | 122 | 109 | 91 | 112 |
| 30 | 172 | 186 | 137 | 185 |
| 40 | 229 | 242 | 181 | 281 |
| 50 | 287 | 308 | 238 | 409 |
| 60 | 361 | 366 | 283 | 561 |
| 70 | 400 | 430 | 337 | 722 |
| 80 | 458 | 482 | 389 | 909 |
| 90 | 537 | 560 | 438 | 1105 |
| 100 | 591 | 630 | 490 | 1278 |
| 120 | 733 | 747 | 601 | 1744 |
| 140 | 878 | 889 | 720 | 2774 |
| 150 | — | — | — | 2931 |
| 160 | 1031 | 1038 | 860 | — |
| 180 | 1182 | 1170 | 975 | — |
| 200 | 1351 | 1301 | 1078 | — |

TABLE 18

Available Calcium/Magnesium (Hardness) Comparisons
Sample $Ca^{+2}$ and $Mg^{+2}$ Content (ppm)

| Additives to Water | Before Column | After Column | Available $Ca^{+2}$ and $Mg^{+2}$ |
|---|---|---|---|
| None | 140 | 120 | −0.74% |
| 0-21-0 | 140 | 380 | 8.89% |
| 0-21-0, Treatment | 140 | 1376 | 51.0% |
| 7-21-0 | 140 | 300 | 5.93% |
| 7-21-0, Treatment | 140 | 1352 | 50.1% |
| Commercial formul. | 140 | 300 | 8.89% |

The test results shown in Table 18 were conducted using Fresno, Calif. city water that contains 140 ppm hardness and 125 ppm alkalinity (both as $CaCO_3$). The fertilizer type is given in terms of NPK, wherein N is the amount of nitrogen as N, P is the amount of phosphorus as $P_2O_5$ and K is the amount of potassium as $K_2O$. The fertilizer levels were 1.0 percent by weight. The Treatment was with organic acid at a level of 700 ppm and phosphonate at a level of 100 ppm. The commercial formulation ("formul.") was the commercial 7-21-0 fertilizer containing humic acid as a soil amendment described above. The hardness (as $CaCO_3$) was measured on the samples (water alone and with additives specified) prior to addition to the column and then after elution of 90 ml of sample from the column containing 20.0 grams of sodic soil. The analysis of the soil yielded 12,127 ppm hardness (as $CaCO_3$) and an alkalinity of 11,232 ppm (as $CaCO_3$). The available $Ca^{+2}/Mg^{+2}$ (hardness) is a measure of ability of an additive to solubilize hardness present in the soil and to transport hardness through the soil, and is set forth in Table 18 above in terms of the percentage increase in $Ca^{+2}/Mg^{+2}$ seen between the before and after column measures.

Summary of the Data

The data set forth in Table 1 demonstrates the effect when various water-soluble phosphonates, water-soluble organic acids and a typical 0-21-0 fertilizer combinations are added to water containing high levels of hardness and alkalinity. This data shows that no precipitate formation occurs with the formulations of the present invention, as it does with a fertilizer formulation without the additive combination, when each is added to the same hard and alkaline water.

As seen in Table 1, with the addition of formulations of the present invention, the turbidity level in all cases is the same turbidity as distilled water. Without the addition of the present invention's phosphonate/organic acid additive to the 0-21-0 fertilizer, significant turbidity is realized. Since turbidity is a measure of precipitation, and since the present invention's phosphonate/organic acid/fertilizer formulation shows no turbidity formation, there would be no precipitate formation when formulations of the present invention are added to water containing high levels of alkalinity and hardness. The total absence of turbidity, and thus precipitates, with the formulation of the present invention means that no plugging will occur when this formulation is utilized in a micro-irrigation system in which hard and alkaline waters are used.

The data set forth in Table 2 demonstrates the effect when various combinations of the present invention's water-soluble phosphonates, water-soluble organic acids and a typical 7-21-0 fertilizer are added to water containing high levels of hardness and alkalinity. This data shows that no precipitate formation occurs with the present invention's 7-21-0 fertilizer formulation, as does with a 7-21-0 fertilizer formulation without the additive combination, when each is added to the same hard and alkaline water.

As seen in Table 2, with the addition of formulations of the present invention, the turbidity level in all cases is the same turbidity as distilled water. Without the addition of the present invention's phosphonate/organic acid additive to the 7-21-0 fertilizer, significant turbidity is realized. Since turbidity is a measure of precipitation, and since the present invention's phosphonate/organic acid/fertilizer formulation shows no turbidity formation, there would be no precipitate formation when formulations of the present invention are added to water containing high levels of alkalinity and hardness. The total absence of turbidity, and thus precipitates, with the formulation of the present invention means that no plugging will occur when this formulation is utilized in a micro-irrigation system in which hard and alkaline waters are used.

The data set forth in Table 3 demonstrates the effect when various combinations, at a wide range of concentrations, of the present invention's water-soluble phosphonates, water-soluble organic acids and a typical 0-21-0 fertilizer, are added to water samples containing a wide range of concentrations of hardness and alkalinity. These levels of hardness and alkalinity encompass most levels found in water that is used in micro-irrigation systems. Similarly, the 0.02-1.0 percent range of fertilizer addition, which was tested both with and without the present invention's additives, includes the most practical concentrations that would be added to the irrigation waters. Levels of fertilizer much higher than 1.0 percent would require special pumps to add the fertilizer at the required high feed rates. Levels of fertilizer less than 0.02 percent would be impractical because there would be too little fertilizer in the irrigation water to be useful for fertigation of the crop.

As seen in Table 3, with the addition of formulations of the present invention, the turbidity level in all cases is the same turbidity as distilled water. Without the addition of the present invention's phosphonate/organic acid additive to the 0-21-0 fertilizer, significant turbidity is realized, even at the low 0.02 percent fertilizer level and low 125 ppm water impurity level. Since turbidity is a measure of precipitation, and since the present invention's phosphonate/organic acid/fertilizer formulation shows no turbidity formation, there would be no precipitate formation when formulations of the present invention are added to water containing high levels of alkalinity and hardness. The total absence of turbidity, and thus precipitates, with the formulation of the present invention means that no plugging will occur when this formulation is utilized in a micro-irrigation system in which hard and alkaline waters are used.

The data set forth in Table 4 demonstrates the effect when various combinations, at a wide range of concentrations, of the present invention's water-soluble phosphonates, water-soluble organic acids and a typical 7-21-0 fertilizer, are added to water samples containing a wide range of concentrations of hardness and alkalinity. These levels of hardness and alkalinity encompass most levels found in water that is used in micro-irrigation systems. Similarly, the 0.02-1.0 percent range of fertilizer addition (which was tested both with and without the present invention's additives), includes the most practical concentrations that would be added to the irrigation waters. Levels of fertilizer much higher than 1.0 percent would require special pumps to add the fertilizer at the required high feed rates. Levels of fertilizer less than 0.02 percent would be impractical because there would be too little fertilizer in the irrigation water to be useful for fertigation of the crop.

As seen in Table 4, with the addition of formulations of the present invention, the turbidity level in all cases is the same turbidity as distilled water. Without the addition of the present invention's phosphonate/organic acid additive to the 7-21-0 fertilizer, significant turbidity is realized, even at the low 0.02 percent fertilizer level and low 125 ppm water impurity level. Since turbidity is a measure of precipitation, and since the present invention's phosphonate/organic acid/fertilizer formulation shows no turbidity formation, there would be no precipitate formation when formulations of the present invention are added to water containing high levels of alkalinity and hardness. The total absence of turbidity, and thus precipitates, with the formulation of the present invention means that no plugging will occur when this formulation is utilized in a micro-irrigation system in which hard and alkaline waters are used.

The data sets shown in Tables 5, 6, 7, and 8 demonstrate the synergistic effect of the present invention's formulation. In each table the turbidities are provided for comparison for no fertilizer or treatment (i.e., water only), a 0-21-0 fertilizer alone, a 0-21-0 fertilizer plus only a water-soluble organic acid, a 0-21-0 fertilizer plus only a water-soluble phosphonate, and then the 0-21-0 fertilizer plus both the water-soluble organic acid and the water-soluble phosphonate. All tests were conducted at two levels of hardness and alkalinity, which levels are typical of most irrigation waters.

As seen in Tables 5, 6, 7 and 8, with the addition of formulations of the present invention, the turbidity level in all cases is the same turbidity as distilled water. When one of the components, either the water-soluble organic acid or the water-soluble phosphonate, is absent, significant turbidity is realized, although less than the addition of fertilizer without any additive. Since turbidity is a measure of precipitation, and since the present invention's phosphonate/organic acid/fertilizer formulation shows no turbidity formation, there would be no precipitate formation when formulations of the present invention are added to water containing high levels of alkalinity and hardness. The total absence of turbidity, and thus precipitates, with the formulation of the present invention means that no plugging will occur when this formulation is utilized in a micro-irrigation system in which hard and alkaline waters are used. Neither the water-soluble organic acid alone nor the water-soluble phosphonate alone approaches providing a total absence of turbidity.

The data sets shown in Tables 9, 10, 11 and 12 demonstrate the synergistic effect of the present invention's formulation. In each table the turbidities are provided for comparison for no fertilizer or treatment (i.e., water only), a 7-21-0 fertilizer alone, a 7-21-0 fertilizer plus only a water-soluble organic acid, a 7-21-0 fertilizer plus only a water-soluble phosphonate, and then the 7-21-0 fertilizer plus both the water-soluble organic acid and the water-soluble phosphonate. All tests were conducted at two levels of hardness and alkalinity, which levels are typical of most irrigation waters.

As seen in Tables 9, 10, 11 and 12, with the addition of formulations of the present invention, the turbidity level in all cases is the same turbidity as distilled water. When one of the components, either the water-soluble organic acid or the water-soluble phosphonate, is absent, significant turbidity is realized, although less than the addition of fertilizer without any additive. Since turbidity is a measure of precipitation, and since the present invention's phosphonate/organic acid/fertilizer formulation shows no turbidity formation, there would be no precipitate formation when formulations of the present invention are added to water containing high levels of alkalinity and hardness. The total absence of turbidity, and thus precipitates, with the formulation of the present invention means that no plugging will occur when this formulation is utilized in a micro-irrigation system in which hard and alkaline waters are used. Neither the water-soluble organic acid alone nor the water-soluble phosphonate alone approaches providing a total absence of turbidity.

The data set forth in Table 13 demonstrates the effect when various combinations, at a wide range of concentrations, of the present invention's water-soluble phosphonates, water-soluble organic acids and a typical 0-21-0 fertilizer, are added to typical ranch well water samples. The ranch from which these water samples were taken was experiencing plugging problems with its micro-irrigation system when using its well water and standard phosphate fertilizers. The 0.02-1.0 percent range of fertilizer addition (which was tested both with and without the present invention's additives), includes the most practical concentrations that would be added to the irrigation waters. Levels of fertilizer much higher than 1.0 percent would require special pumps to add the fertilizer at the required high feed rates. Levels of fertilizer less than 0.02 percent would be impractical because there would be too little fertilizer in the irrigation water to be useful for fertigation of the crop.

As seen in Table 13, with the addition of formulations of the present invention, the turbidity level in all cases is the same turbidity as distilled water. Without the addition of the present invention's phosphonate/organic acid additive to the 0-21-0 fertilizer, significant turbidity is realized, even at the low 0.02 percent fertilizer level. Since turbidity is a measure of precipitation, and since the present invention's phosphonate/organic acid/fertilizer formulation shows no turbidity formation, there would be no precipitate formation when formulations of the present invention are added to water containing high levels of alkalinity and hardness. The total absence of turbidity, and thus precipitates, with the formulation of the present invention means that no plugging will occur when this formulation is utilized in a micro-irrigation system in which hard and alkaline waters are used.

The data set forth in Table 14 demonstrates the effect when various combinations, at a wide range of concentrations, of the present invention's water-soluble phosphonates, water-soluble organic acids and a typical 7-21-0 fertilizer, are added to typical ranch well water samples. The ranch from which these water samples were taken was experiencing plugging problems with its micro-irrigation system when using its well water and standard phosphate fertilizers. The 0.02-1.0 percent range of fertilizer addition (which was tested both with and without the present invention's additives), includes the most practical concentrations that would be added to the irrigation waters. Levels of fertilizer much higher than 1.0 percent would require special pumps to add the fertilizer at the required high feed rates. Levels of fertilizer less than 0.02 percent would be impractical because there would be too little fertilizer in the irrigation water to be useful for fertigation of the crop.

As seen in Table 14, with the addition of formulations of the present invention, the turbidity level in all cases is the same turbidity as distilled water. Without the addition of the present invention's phosphonate/organic acid additive to the 7-21-0 fertilizer, significant turbidity is realized, even at the low 0.02 percent fertilizer level. Since turbidity is a measure of precipitation, and since the present invention's phosphonate/organic acid/fertilizer formulation shows no turbidity formation, there would be no precipitate formation when formulations of the present invention are added to water containing high levels of alkalinity and hardness. The total absence of turbidity, and thus precipitates, with the formulation of the present invention means that no plugging will occur when this formulation is utilized in a micro-irrigation system in which hard and alkaline waters are used.

The data set forth in Table 15 demonstrates the effectiveness of the present invention's water-soluble phosphonates, water-soluble organic acids and a typical 7-21-0 fertilizer, when added to ranch well water samples, in comparison to a commercial 7-21-0 fertilizer formulation that is claimed to have soil amendment properties. The ranch from which these water samples were taken was experiencing plugging problems with its micro-irrigation system when using its well water and standard phosphate fertilizers, and required a soil amendment because of poor water penetration. The commercial 7-21-0 fertilizer formulation is known to contain humic acid as a soil amendment agent. The 0.01-1.0 percent range of fertilizer addition levels includes the most practical concentrations that would be added to the irrigation waters, down to below practical levels. Levels of fertilizer much higher than 1.0 percent would require special pumps to add the fertilizer at the required high feed rates. Levels of fertilizer less than 0.01 percent would be impractical because there would be too little fertilizer in the irrigation water to be useful for fertigation of the crop.

As seen in Table 15, again, with the addition of formulations of the present invention, the turbidity level in all cases is the same turbidity as distilled water. The commercial humic acid containing 7-21-0 fertilizer formulation resulted in high turbidity, and thus high precipitate formation, even at the very low 0.01 percent fertilizer level. Since turbidity is a measure of precipitation, and since the present invention's phosphonate/organic acid/fertilizer formulation shows no turbidity formation, there would be no precipitate formation when formulations of the present invention are added to water containing high levels of alkalinity and hardness. The total absence of turbidity, and thus precipitates, with the formulation of the present invention means that no plugging will occur when this formulation is utilized in a micro-irrigation system in which hard and alkaline waters are used. The commercial humic acid containing fertilizer causes heavy precipitate formation in these well water samples. Its use would not alleviate, and easily might increase, the plugging being experienced at the ranch from which the well water samples were taken.

The data set forth in Table 16 and FIG. 1 is a comparison of the elution rates of water, in varying quantities incrementally increasing from 10 to 200 ml, from a column packed with sodic soil of water, (1) without any additive, (2) with a 0-21-0 fertilizer at a 1 percent level and (3) with the 0-21-0 fertilizer plus various water soluble phosphonates (100 ppm)/water-soluble organic acids (700 ppm) treatments. The water used in all tests was Fresno, Calif., city water. As seen from this data, the water containing the present invention's formulation, at all quantities tested, elutes faster from the column than either untreated water or water plus just the 0-21-0 fertilizer. This faster elution rate means a better water penetration.

The data set forth in Table 17 and FIG. 2 provides a comparison of the elution rates of water, in varying quantities incrementally increasing from 10 to 200 ml, from a column packed with sodic soil of water, (1) without any additive, (2) with a 7-21-0 fertilizer at a 1 percent level, (3) with the 7-21-0 fertilizer plus various water-soluble phosphonates (100 ppm)/water-soluble organic acids (700 ppm) treatments and (4) with the commercial humic acid containing 7-21-0 fertilizer. The water used in all tests was Fresno, Calif., city water. As seen from this data, the water containing the present invention's formulation, at all quantities tested, elutes faster from the column than the untreated water or the water plus just the 7-21-0 fertilizer or the water plus the commercial humic acid containing 7-21-0 fertilizer. This faster elution rate means a better water penetration.

The elution water from the tests shown in Tables 16 and 17, and in FIG. 1 and FIG. 2, were analyzed for available calcium and magnesium. The data set forth in Table 18 and in FIG. 3 are the results of these analyses, namely the combined available $Ca^{+2}/Mg^{+2}$ in ppm before and after elution runs, plus the percent change, with (1) untreated water, (2) with a 0-21-0 fertilizer at a 1 percent level (3) with the 0-21-0 fertilizer plus various water soluble phosphonates (100 ppm)/water-soluble organic acids (700 ppm) treatment, (4) with a 7-21-0 fertilizer at a 1 percent level and (5) with the 7-21-0 fertilizer plus various water soluble phosphonates (100 ppm)/water-soluble organic acids (700 ppm) treatments and (6) with the commercial humic acid containing 7-21-0 fertilizer. As shown in Table 18, the available calcium/magnesium in the water before the elutions was in all instances 140 ppm. The data of Table 18 and FIG. 3 demonstrate that the present invention's water-soluble phosphonate/water-soluble organic acid/fertilizer, for both the 0-21-0 and 7-21-0 formulations, moves significantly higher levels of calcium and magnesium cations (hardness) through the soil as compared to the respective fertilizers without treatment, and as compared to the commercial 7-21-0 fertilizer with humic acid. As mentioned above, an increase in mobility or availability of the calcium and magnesium cations (hardness) through a sodic soil results in a soil with better or increased water penetration. Since much more hardness is solubilized with the present invention's formulations, with both a 0-21-0 fertilizer and a 7-21-0 fertilizer, in comparison to the respective fertilizers alone, in comparison to the fertilizer with humic acid, and in comparison to untreated water, the present invention's compositions are clearly effective in modifying the sodic soil. In other words, the formulations of the present invention also have effective soil amendment characteristics that modify the soil such that a more porous soil with much better water penetration is realized.

The preferred phosphonate dosage is within the range of from about 0.02 weight percent to about 5 weight percent of the phosphate fertilizer as $P_2O_5$. The preferred organic acid dosage is within the range of from about 0.02 weight percent to about 20 weight percent of the phosphate fertilizer as $P_2O_5$.

Irrigation-System Cleaning Composition and Method

The typically most prevalent conditions that diminish the suitability of the water quality for micro-irrigation, or otherwise raise the risk of irrigation-system fouling, are: (1) inorganic loading of the source water, (2) organic loading of the source water; (3) addition of fertilizers and/or soil amendments to the source water; and (4) efficiency of the filtration system.

Inorganic Loading of the Source Water

Although irrigation water sources vary dramatically, they frequently contain a considerable amount of inorganic salts, dissolved hydrogen sulfide and carbon dioxide. The presence of such constituents can lead to several fouling problems. High levels of calcium, magnesium and carbon dioxide, at a basic pH (7 to 8 and higher), form significant amounts of insoluble (or only slightly soluble) calcium and magnesium carbonates. Under such pH conditions, iron and manganese, even at low levels, form significant levels of insoluble or only slightly soluble iron and manganese oxides. The propensity of these salts to precipitate out of solution is exacerbated in an irrigation system because much of the irrigation tubing is typically above ground and black in color. The irrigation tubing and emitters or micro-sprinklers usually have a black coloration which has been added as a UV inhibitor to prevent deterioration of the plastic due to sunlight. The black coloration unfortunately exacerbates plugging or fouling problems because it absorbs light and the light that is absorbed is converted to heat. The heat raises the water temperature which escalates precipitation of calcium and magnesium carbonates (similar to the scale that builds up on a tea kettle). This increase in temperature of the irrigation components and subsequent precipitation of carbonate salts becomes even more dramatic when the irrigation system is shut down and under "no flow" conditions. The significantly higher temperature inside the black irrigation components under a no-flow condition evaporates irrigation water, which increases the concentration of the constituents, causing a higher degree of precipitation and even more plugging potential.

Biological Loading of the Source Water

Biological loading in the source water results from two major factors, namely algae and/or bacteria. Both algae and bacteria typically are present if surface water, such as a reservoir, canal, river or pond, is used as the source of the irrigation water. Bacteria and bacterial slimes typically also are present if the source of the irrigation water is subsurface, such as a well. Irregardless of the source of the water, these biological materials proliferate inside the irrigation system and bind to the surfaces of the irrigation system and to the scale deposits in the system, ultimately fouling the irrigation system.

Addition of Fertilizers and/or Soil Amendments to the Source Water

Fertilizers are generally defined as materials that add nutrient value to the soil that enables enhanced growth and development of the plant or crop. Soil amendments are generally defined as materials that enable the nutrients, already in the soil, to be more efficiently utilized and transported to the plant or crop being grown. Regardless of whether the material is a fertilizer or soil amendment, these additives, when added to an irrigation system for distribution, can cause significant fouling of the irrigation system and its components.

These problematic fertilizer and/or soil amendment additives include inorganic materials such as: (1) the various NPK (nitrogen, phosphorus, and potassium) fertilizer formulations; (2) the diverse micronutrient formulations that can contain iron, zinc, or manganese, as well as other heavy metals; and (3) the common inorganic soil amendments such as gypsum (calcium sulfate pentahydrate) and lime (calcium carbonate). All of these additives can elevate the risk of fouling of the irrigation system due to precipitation of inorganic salts. Chart 1 above provides solubility data for common cation/anion combinations to demonstrate the precipitation and deposit formation potential thereof. In other words, Chart 1 shows the anions and cations that, when both are present, lead to insoluble inorganic salt formation that can cause plugging in micro-irrigation systems.

Organic additives used as fertilizers and/or soil amendments, such as compost teas (liquid compost), fish emulsions and the like, are typically made via a biological fermentation process. The bacteria that already proliferate in these additives exacerbate biological plugging of the irrigation system.

Efficiency of the Filtration System

Whether the water source is surface or subsurface, freshly-pumped irrigation water can contain large particulate material which can be removed with a filtration system, such as a screen, disk, and/or sand media bed. Nevertheless, a considerable amount of fine particulate matter passes through the filtration system and binds with both organic material and precipitating inorganic salts, forming larger particles that further cause fouling of the irrigation system. Another, and worse, filtration-system related problem is the ill-considered practice of adding fertilizers and/or soil amendments downstream of the filtration system. This "downstream addition" practice eliminates additive-derived precipitates from plugging the filters, but frequently leads to severe deposits within the irrigation system, which is a condition the filtration system is intended to prevent. Further, the severity of emitter plugging due to "downstream addition" can even shut down an irrigation system, and bring about a need for immediate remediation to avoid crop loss due to the lack of irrigation water.

Currently, the two most common methods for cleaning an irrigation system are treatment with sulfuric acid or an adduct of sulfuric acid and urea (monocarbamide dihydrogen sulfate or "MCDS") which is commercially available under the brand name of N-pHURIC® from Agrium of Calgary, Alberta, Canada. These two common irrigation-system treatments are not, however, entirely satisfactory as demonstrated in the examples below. In addition, both products are extremely dangerous to handle and use because both are extremely corrosive. If not handled and used properly, these products can be hazardous for the user and harmful to the irrigation system.

The present cleaning composition and method provide a reliable, safe, economical, much less corrosive approach to cleaning an irrigation system that has been compromised due to fouling or plugging arising from one or more sources such as those described above. The irrigation system is cleaned by addition of a unique combination of a strong organic acid and a dispersant to the irrigation water, and more broadly the organic acid or blend (combination) of organic acids without the dispersant. Cleaning of the irrigation system is accomplished with a deposit-removing amount of certain water-soluble organic acids, such as and preferably formic acid (which is used exemplary in most of the discussions below), usually and preferably in combination with a small amount of a dispersant, present in the water of an irrigation system for a period of time sufficient to remove, suspend and/or solubilize such deposits. The dispersant must be sufficiently water soluble and can be selected from a broad range of compounds. Typical dispersants used in conjunction with the formic acid in this formulation are the water soluble phosphonates described above. Two of the more common phosphonate dispersants are 1-hydroxyethylidene-1,1-diphosphonic acid (HEDPA) or its water-soluble salts derived from sodium, potassium or ammonium, and amino tri(methylenephosphonic acid) (ATMP) or its water-soluble salts derived from sodium, potassium or ammonium. Again, the list of phosphonates above provides a more detailed list of phosphonate dispersants within broad embodiments of this irrigation-system cleaning embodiment of the present invention. Dispersants of this type act upon deposits of inorganic scale and biological materials to maintain them in a fine state of subdivision (microscopic) and the surface of these microscopic particles are electrostatically charged, whereby they are prevented from agglomeration and from re-deposition onto the surfaces of the irrigation system. In addition, these dispersants are effective in the present method at very low ppm dosages and afford substantial corrosion protection to ferrous and non-ferrous metals components of an irrigation system.

The formic acid, which may be used alone in the practice of the invention, is commercially available. It is typically available in concentrations ranging from 75 to 95 percent as formic acid in water. The phosphonate dispersants are also commercially available, typically as aqueous solutions ranging from 20 to 40 percent on an actives basis. The composition of formic acid and optional dispersant are fed into the irrigation system in either a shock or continuous treatment mode.

For a typical shock treatment the formulation is fed into the irrigation system at a rate (or level) of from about 1 to about 10 kg, and preferably from about 3 to about 5 kg., actives per acre being currently or actively served by the irrigation system. For an approximately 40 weight percent actives formulation, the preferred rate or level of feed is about 2 to 3 gallons per acre being currently or actively served by the system. The acres being currently or actively served by the system at any given time is typically not the entire field served by an irrigation system, but instead a block of the field or system that encompasses the acreage normally under irrigation simultaneously. This "per acre" basis for determining feed rate presumes a reasonably constant or consistent irrigation-system water capacity per acre being served.

The optimum or near optimum feed rate, whereby an efficient and successful, but not impractically excessive, concentration of the actives is fed to the irrigation water, depends on the water quality and the extent to which the irrigation system is compromised.

To accomplish a shock treatment, the present cleaning formulation (for example, at a concentration of about 40 weight percent actives) is typically introduced into the irrigation system at the manifold just before the irrigation system enters the field. A typical drip-type or micro-irrigation pumping system pumps water at a rate of approximately 1000 gallons per minute, at a pressure of about 40 to 80 psi. The present cleaning formulation is typically introduced into the water of the irrigation system, for instance and preferably via a positive displacement pump, at a rate of about 1.0 to about 1.5 gallons per minute. Such a feed rate is about 0.1 to about 0.15 percent of the rate at which the irrigation water is being pumped. A typical block to be irrigated is about 20 acres. At the 1.0 to 1.5 gallon per minute feed rate of the formulation, the introduction of the formulation requires about 40 to 60 minutes. To insure the product is reaching the most distant ends of the irrigation block, the irrigation-water pH is tested at the end of the farthest point in the block. Untreated irrigation water typically has a pH of 7.5 or greater. Upon introduction of the product to the irrigation water at the typical levels and rates indicated here, the irrigation-water is acidified and its pH drops. Upon addition of sufficient formulation (both as to covering the block being serviced and as to sufficient concentration for the particular irrigation water), the irrigation-water pH seen at the farthest point of the active section of irrigation system typically is about 2.5 to about 3.0. Upon detection of sufficient coverage, by this or another method, the irrigation-water feed is shut off, stopping its flow. The irrigation system, or that part of the system under treatment, is then allowed to stand for a sufficient time period, which typically is within the range of about 3 to about 24 hours, after which the irrigation system is flushed with water. This type of shock treatment is typically done once or twice a growing season, but irrigation systems with severe plugging problems require a more frequent treatment regime.

For a maintenance treatment, the present cleaning formulation is fed at a rate sufficient to lower the irrigation-water pH to about 6.5. The actual feed rate in a given circumstance depends on the concentration of actives in the formulation, the water quality, and the condition of the irrigation system, that is, whether the irrigation system is compromised or instead is new or has been previously cleaned out by a shock treatment. If the system has been compromised, and thus is operating below its capacity due to fouling, a shock treatment prior to implementing the maintenance treatment is at least preferred and in many instances necessary. To accomplish a maintenance treatment, the irrigation water is preferably analyzed first to determine the level of formulation required to achieve an irrigation-water pH of about 6.5. Since irrigation waters vary dramatically and usually are naturally buffered, each irrigation site is preferably analyzed in this manner. The formulation addition rate would then be adjusted to the flow rate of the irrigation water such that a pH of about 6.5 is maintained. For irrigation systems that possess a variable water flow rate, a flow meter and pH probe/controller with a feedback system preferably are utilized to proportionally control the positive displacement pump, such that a pH of 6.5 is maintained.

As mentioned above, the water quality of the irrigation water varies dramatically and the amount of the present cleaner formulation required for cleaning or maintaining the cleanliness of an irrigation system is preferably determined prior to implementing either program. To establish the correct formulation level, a "demand curve" (or "titration curve") is preferably generated for the source water used for irrigation. A demand curve is produced by determining the amount of the additive, such as the present formulation, required to change the source irrigation-water pH from its normal state to a different, defined pH. Preferably the additive is added incrementally, such as by titration of a dilute water solution thereof, to a known weight or volume sample of the irrigation water source while the pH of irrigation-water sample is monitored. This step of the present method is illustrated in Cleaner Example 2 below.

Cleaner Comparative Example 1 and Example 2, Demand Curves

Demand curves were separately prepared for the commercial N-pHURIC® brand irrigation-system cleaner and for a formulation of the present invention containing about 40 weight percent actives, which actives were primarily formic acid plus a small amount of ATMP, using approximately equal samples of irrigation water from a grower's 20.5 acre irrigation block which was experiencing fouling problems. In Cleaner Comparative Example 1, an irrigation-water sample of 112.8 grams was titrated with a 0.0823 volume percent aqueous solution of the N-pHURIC® brand irrigation-system cleaner. In Cleaner Example 2, an irrigation-water sample of 121.1 grams was titrated with a 0.150 volume percent aqueous solution of the formulation of the present invention. These stated concentrations of the titrants are based on "as is" products, and are not on an actives basis. The changes of the pH of the irrigation water samples with increasing loading of the titrated products were recorded at intervals starting with the irrigation water samples' initial 7.8 pH down to a pH of 2.0 for both examples. In each instance, the amount of titrant required to lower the irrigation water pH to a defined value, which here was a pH of 3.0, was determined from the tabulated data. (Plots of the titrant versus pH prepared from the tabulated data would of course provide the same information, but were not needed in either instance.) The "pH 3.0" product demands, that is, the volumes of the as-is or neat products required to lower the pH of 1,000 gallons of irrigation water to pHs of 3.0, were calculated, each as shown below in the respective Table 19 and Table 20 tabulated data.

TABLE 19

| Cleaner Comparative Example 1 N-pHURIC ® Demand Curve | |
|---|---|
| Product Weight Added (grams) | Post-Addition Sample pH |
| 0.00 | 7.8 |
| 0.31 | 7.7 |
| 0.61 | 7.4 |
| 0.99 | 7.2 |
| 1.24 | 6.5 |
| 1.49 | 5.8 |
| 1.63 | 5.0 |

TABLE 19-continued

| Cleaner Comparative Example 1 N-pHURIC ® Demand Curve | |
|---|---|
| Product Weight Added (grams) | Post-Addition Sample pH |
| 1.85 | 4.0 |
| 2.21 | 3.5 |
| 2.37 | 3.0 |
| 2.58 | 2.5 |
| 2.65 | 2.0 |

The N-pHURIC® demand was calculated as follows. The amount of the product titrant at 0.0823 vol. percent required to lower the pH of 112.8 grams of irrigation water to a pH of 3.0 was 2.37 grams. The calculation of the Demand in terms of volume percent (converted from weights on a specific gravity of 1.0 for water or typical water solutions) is set forth below in Equation ("Eq.") 1, and is followed by its conversion to gallons of product per 1,000 gallons of irrigation water.

$$[(2.37 \text{ grams}) \times (0.0823\%)]/(112.8 \text{ grams}) = 0.173\% \text{ by volume} \quad (1)$$

From Eq. 1 it is determined that the "pH 3.0" demand for the N-pHURIC® cleaner is 1.73 gallons/1,000 gallons of irrigation water.

TABLE 20

| Cleaner Example 2 Formulation Demand Curve | |
|---|---|
| Product Weight Added (grams) | Post-Addition Sample pH |
| 0.00 | 7.8 |
| 0.25 | 7.7 |
| 0.84 | 7.2 |
| 1.01 | 6.9 |
| 1.27 | 6.5 |
| 1.48 | 6.0 |
| 1.60 | 5.7 |
| 1.71 | 5.2 |
| 1.81 | 4.7 |
| 2.02 | 4.0 |
| 2.26 | 3.4 |
| 2.51 | 3.0 |
| 2.82 | 2.5 |
| 3.40 | 2.0 |

The present formulation demand was calculated as follows. The amount of the product titrant at 0.150 vol. percent required to lower the pH of 121.1 grams of irrigation water to a pH of 3.0 was 2.51 grams. The calculation of the Demand in terms of volume percent (converted from weights on a specific gravity of 1.0 for water or typical water solutions) is set forth below in Equation ("Eq.") 2, and is followed by its conversion to gallons of product per 1,000 gallons of irrigation water.

$$[(2.51 \text{ grams}) \times (0.150\%)]/(121.1 \text{ grams}) = 0.311\% \text{ by volume} \quad (2)$$

From Equation 2 it is determined that the "pH 3.0" demand for the present formulation (at about 40 wt. percent actives) is 3.11 gallons/1,000 gallons of irrigation water. The data of Tables 19 and 20 can likewise be used to calculate the demand of either additive for other defined pHs, such as for a pH of 6.5.

As seen from Cleaner Comparative Example 1 and Example 2, and from Tables 19 and 20, more product is required per 1000 gallons of irrigation water for the present formulation than is required for the commercial N-pHURIC® formulation. The reason for this difference is that the as-is N-pHURIC® material is at a higher concentration and has a much greater density than the formic acid formulation. The N-pHURIC® used in this evaluation is composed, on a weight basis, of 32.14% urea, and 49.00% sulfuric acid in water. In contrast, the present formulation is 40.0% formic and 1.0% phosphonate (ATMP) in water. The same amount of acidity, of course, is required to neutralize the alkalinity of the irrigation water. The dramatic benefit of the present formulation over a commercial product such as N-pHURIC® is seen when their modes of action are considered. When an irrigation system is treated with N-pHURIC®, it must be treated continuously, with the irrigation water flowing and the N-pHURIC® additive being fed, for an extended period of time (typically namely 4 to 6 hours) to dissolve any of the deposit fouling the system. The reason for this extended active-treatment time period is that N-pHURIC® acts on calcium carbonate according to the reaction shown in Equation 3:

$$(NH_2CONH_2)(H_2SO_4)_{aq} + CaCO_{3s} \rightarrow NH_2CONH_{2aq} + CaSO_{4s} + H_2O + CO_{2g} \quad (3)$$

The reaction of Equation 3 above reveals that the acidity of the N-pHURIC® dissolves the insoluble calcium carbonate and forms a slightly more soluble, but still substantially insoluble, calcium sulfate as well as free urea, water and carbon dioxide gas. This reaction, however, does not proceed beyond negligible degree under substantially static conditions. Instead, under substantially static conditions, as calcium carbonate deposit begins to dissolve, the very slightly soluble calcium sulfate derived therefrom deposits onto the surface of the calcium carbonate deposit, forming a film which passivates the surface of the deposit, and thereby inhibits further calcium carbonate dissolution. The passivation of the calcium carbonate deposits with calcium sulfate, and resultant inhibition of calcium carbonate dissolution, is hampered, but possibly not completely stopped, under dynamic conditions whereby the localization of calcium sulfate upon formation is reduced. Therefore a considerable turbulence, such as that created by flowing irrigation water, will to some degree boost the deposit dissolution activity of sulfuric acid/urea adduct irrigation-system cleaners such as N-pHURIC® although they remain very poor cleaners for removing deposits from the irrigation system, even under prolonged periods of flowing water.

In contrast, the formic acid in the present formulation dissolves the calcium carbonate in the irrigation system, reacting with it to form the very soluble calcium formate plus carbon dioxide and water. In addition, the phosphonate will keep any other solids dispersed. The overall formic acid reaction with calcium carbonate is shown in Equation 4 below.

$$2\ HCOOH_{aq} + CaCO_{3s} \rightarrow Ca^{+2}_{aq} + 2(HCOO)^-_{aq} + H_2O + CO_{2g} \quad (4)$$

As seen from Equation 4, the mode of action for the present formulation is totally different than that of the sulfuric acid/urea adduct irrigation-system cleaners. Since calcium formate is very soluble, the calcium carbonate on the surface of the irrigation system begins to dissolve and continues to dissolve until all the calcium carbonate is removed or the formic acid is totally consumed. Given the extreme solubility of calcium formate and the large excess of formic acid present when the formulation is charged into the irrigation water in a sufficient amount to decrease the water pH to 3.0, a dynamic condition created by large amounts of flowing water is not required to facilitate the continuation of the cleaning dissolution to completion. This permits the present formulation to merely be introduced into the irrigation system, without subsequent replenishment. Instead, after charging the formulation, the irrigation system is simply shut off for a hold period during which the present formulation is left to totally dissolve and disperse any deposits. Such hold period usually lasts from about 3 to about 24 hours. At the end of the hold period, the irrigation water is turned back on and the irrigation system is flushed out with regular irrigation water.

The manner in which a shock treatment cleaning is conducted has a significant impact on the duration of the cleaner-feed interval, and of course the amount of cleaning agent used. In the method of the present invention, using the cleaning composition of the present invention, the cleaner-feed interval only continues until a sufficiently low pH, such as a pH of about 3.0, is realized substantially throughout the system, or part of the system, being cleaned. Typically, a pH of about 3.0 is seen at the end of the irrigation system after about 40 to about 60 minutes after the feeding of the present formulation begins. As indicated above, upon reaching the desired pH, the feeding of the present formulation is discontinued and the water flow is shut off. In comparison, a sulfuric acid/urea adduct type of cleaner, such as N-pHURIC®, must be continuously fed to an irrigation system throughout the entire cleaning interval. The manufacturer's recommendation for a clean-out or shock treatment using N-pHURIC GTO, which has a sulfuric acid equivalence of 49% and 15% urea (as N), is to (1) feed sufficient product into an irrigation system to lower the pH to 2.5 or 3.0, (2) then operate at this pH level for three to six hours (after the initial feed interval), and (3) then stop the injection of the product and flush the system with just water. The present formulation's much shorter feed time of about 40 to 60 minutes, compared about 4 to 6 hours or more for a sulfuric acid/urea adduct product of comparable actives, translates to approximately a four to six times lower consumption of cleaning product, and that astounding achievement is accompanied by its far superior cleaning activity.

Cleaner Comparative Example 3 and Example 4, Usage Requirements

The usage requirements for the commercial sulfuric acid/urea adduct type of cleaner sold under the N-pHURIC® brand name and for the formulation of the present invention, both of which are described above with reference to the determination of their respective demand curves, were determined as follows. The N-pHURIC® was determined to have a "pH of 3.0" demand of 1.73 gallons of product per 1,000 gallons in the irrigation water which was tested. The present formulation was determined to have a higher "pH of 3.0" demand of 3.11 gallons of product per 1,000 gallons in the irrigation water which was tested. Presuming an upper-end shock-treatment feed period for each, namely 6 hours for the N-pHURIC® product and 1 hour for the present formulation, the amount of N-pHURIC® used for a single shock treatment (622.8 gal.) was more than triple the amount of the present formulation (186.6 gal.), as seen in Equations 5 and 6 below respectively.

$$\frac{(1.73\ \text{gallons})}{(1000\ \text{gallons})} \times \frac{(1000\ \text{gallons})}{(\text{min.})} \times \frac{(60\ \text{min.})}{(\text{hr.})} \times (6\ \text{hr.}) = 622.8\ \text{gallons} \quad (5)$$

$$\frac{(3.11\ \text{gallons})}{(1000\ \text{gallons})} \times \frac{(1000\ \text{gallons})}{(\text{min.})} \times \frac{(60\ \text{min.})}{(\text{hr.})} \times (1\ \text{hr.}) = 186.6\ \text{gallons} \quad (6)$$

Cleaner Comparative Example 5 and Example 6, CaCO3 Dissolution

The comparative effectiveness of the commercial sulfuric acid/urea adduct type of cleaner sold under the N-pHURIC® brand name and of the formulation of the present invention in dissolving a calcium carbonate deposit under a substantially static water-flow condition was determined under a simulated "sea shell" test, as follows. Since sea shells are composed primarily of calcium carbonate together with a small amount of organic material, and in that respect they simulate calcium carbonate deposits formed inside an irrigation system, small particles of sea shells were used to establish the effectiveness of the respective cleaners in dissolving calcium carbonate deposits under substantially static water-flow conditions. In each test, an approximately 0.05 gram particle of a sea shell was placed into a 100 ml Erlenmeyer flask containing 100 ml of a 10% by volume aqueous solution of the respective cleaning product (N-pHURIC® or the present formulation). The sea shell particles were then weighed at time intervals and recorded respectively in Tables 21 and 22 below.

TABLE 21

Cleaner Comparative Example 5
Sea Shell Particle Dissolution in 10% N-pHURIC ®

| Elapsed Time (min.) | Sea Shell Particle Weight (grams) |
|---|---|
| 0 | 0.053 |
| 1 | 0.052 |
| 2 | 0.051 |
| 5 | 0.050 |
| 60 | 0.049 |
| 120 | 0.050 |
| 240 | 0.049 |
| 480 | 0.048 |
| 720 | 0.048 |

TABLE 22

Cleaner Example 6
Sea Shell Particle Dissolution in 10% Present Formulation

| Elapsed Time (min.) | Sea Shell Particle Weight (grams) |
|---|---|
| 0 | 0.065 |
| 1 | 0.049 |
| 2 | 0.038 |
| 5 | 0.019 |
| 10 | 0.011 |
| 15 | Present but too small to isolate |
| 20 | Totally dissolved |

The formation of carbon dioxide within the first few seconds, and then its almost immediate cessation, was observed in the flask in which a sea shell particle was immersed in diluted N-pHURIC®, and there was no further evolution of carbon dioxide thereafter. This phenomenon is consistent with the passivation of the calcium carbonate particle by a film of calcium sulfate, and the ensuing inhibition of calcium carbonate dissolution, in the presence of a sulfuric acid/urea adduct under the substantially static conditions discussed above. In addition, the passivation of the sea shell particle and inhibition of dissolution is also demonstrated by the small weight loss in the first minute (less than 2 wt. percent) followed by negligible weight loss (less than 8 wt. percent total) over the next six hours. (See the data of Table 21 above.) The calcium carbonate (sea shell) particle appears unaffected and just remains in the bottom of the flask.

In contrast, the sea shell particle immersed in the diluted present formulation was observed to begin to liberate carbon dioxide immediately, and to continue to evolve carbon dioxide until the time at which the particle was totally dissolved. As indicated by the data of Table 22 above, the sea shell particle was completely dissolved within 20 minutes, and any other materials liberated during the dissolution process were not detectable and thus presumably dispersed in solution by the phosphonate in the formulation. This is all consistent with the formation of the very soluble calcium formate upon the mechanism of formic-acid dissolution of calcium carbonate discussed above, plus the keeping of any other material in fine suspension via the dispersant activity of the phosphonate in the formulation.

Another advantage of the present formulation is its low corrosivity. As mentioned above, irrigation systems are typically constructed from plastic and metal, such as mild steel, components. Strong mineral acids such as sulfuric, hydrochloric, nitric and phosphoric acids are corrosive and if not handled very carefully when used in or about irrigation systems these acids can damage the metal and plastic components. Although the commercial N-pHURIC® product is an adduct of urea and sulfuric acid, rather than a mixture, it is still very corrosive when compared to the formic-acid based formulation of the present invention, as demonstrated in Cleaner Comparative Examples 7 and 8, and Cleaner Examples 9 and 10 below.

Cleaner Comparative Examples 7 and 8, and Examples 9 and 10, Corrosion

Mild steel corrosion coupons (standard test coupons for determining the corrosivity of a given environment) were each separately suspended in equal volumes of the following: (a) the commercial N-pHURIC® product neat (Cleaner Comparative Example 7); (b) a 5 percent aqueous solution of the commercial N-pHURIC® product (Cleaner Comparative Example 8); (c) the about 40 percent actives formulation of the present invention neat (Cleaner Example 9); and (d) a 5 percent aqueous solution of the formulation of the present invention (Cleaner Example 10). The weights of coupons with elapsed time were determined and recorded, and the percent coupon loss was calculated therefrom. The data for each (comparative) example is set forth in Tables 23 to 26 below.

TABLE 23

Cleaner Comparative Example 7
N-pHURIC ® (neat, as is)

| Elapsed Time | Coupon Weight | Wt. Percent Coupon Loss |
|---|---|---|
| 0 hrs. | 1.15 g | 0.0% |
| 3 hrs. | 1.13 g | 1.7% |
| 6 hrs. | 1.12 g | 2.6% |
| 24 hrs. | 1.09 g | 5.2% |
| 48 hrs. | 1.03 g | 10.4% |
| 72 hrs. | 1.01 g | 12.2% |
| 144 hrs. | 0.99 g | 13.9% |

TABLE 24

Cleaner Comparative Example 8
5 percent N-pHURIC ® in water

| Elapsed Time | Coupon Weight | Wt. Percent Coupon Loss |
|---|---|---|
| 0 hrs. | 1.16 g | 0.0% |
| 3 hrs. | 1.13 g | 2.6% |
| 6 hrs. | 1.11 g | 4.3% |
| 24 hrs. | 0.95 g | 18.1% |
| 48 hrs. | 0.53 g | 54.3% |

TABLE 24-continued

Cleaner Comparative Example 8
5 percent N-pHURIC ® in water

| Elapsed Time | Coupon Weight | Wt. Percent Coupon Loss |
|---|---|---|
| 72 hrs. | 0.22 g | 81.0% |
| 144 hrs. | 0.00 g | 100.0% |

TABLE 25

Cleaner Example 9
Present Formulation (neat, as is)

| Elapsed Time | Coupon Weight | Wt. Percent Coupon Loss |
|---|---|---|
| 0 hrs. | 1.16 g | 0.0% |
| 3 hrs. | 1.15 g | 0.9% |
| 6 hrs. | 1.13 g | 2.6% |
| 24 hrs. | 1.12 g | 3.4% |
| 48 hrs. | 1.12 g | 3.4 % |
| 72 hrs. | 1.11 g | 4.3 % |
| 144 hrs. | 1.11 g | 4.3 % |

TABLE 26

Cleaner Example 10
5% Present Formulation in water

| Elapsed Time | Coupon Weight | Wt. Percent Coupon Loss |
|---|---|---|
| 0 hrs. | 1.15 g | 0.0% |
| 3 hrs. | 1.14 g | 0.9% |
| 6 hrs. | 1.14 g | 0.9% |
| 24 hrs. | 1.12 g | 2.6% |
| 48 hrs. | 1.10 g | 4.3% |
| 72 hrs. | 1.08 g | 6.1% |
| 144 hrs. | 1.03 g | 10.4% |

As indicated in the data of Tables 23-26 above, a sulfuric acid/urea adduct cleaner, such as the commercial N-pHURIC® product, is significantly more corrosive than the formic-acid based formulation of the present invention. Further, the corrosivity of the commercial N-pHURIC® product, as measured by wt. percent coupon loss, is greater in dilute aqueous solution than the neat product at all time intervals tested, and leads to total consumption of the test coupon at or prior to the end of the 144 hour test.

Distribution Uniformity Test

The Distribution Uniformity evaluation is a test developed by California Polytechnic University to quantify the distribution, or lack thereof, of water to the crop that is being irrigated. Distribution Uniformity or "DU" is the measurement of the uniformity of the distribution or delivery of water throughout the entire block that is being irrigated. DU is a ratio comparison of the "lower quarter" delivery of water to the overall average delivery of water within the block being evaluated. The numeric DU of a block is the average water-delivery volume per unit time of the 25 percent poorest-performing (in terms of water delivery) emitters divided by the average water-delivery volume per unit time of all of the emitters, or DU=A¼L/A100, wherein "A¼L" is the average of the lowest ¼ collected-water values and "A100" is the average of all of the collected-water values. In practice, a statistically-significant proportion of the emitters on the irrigation system are tested, and the water emitted from each while under normal irrigation-system water flow is collected during a given time interval, for instance 5 minutes, measured and the DU is determined from the averages after the lowest 25 percent are identified. This test was devised for use in irrigation management particularly to avoid under-irrigation by compensating for non-uniformity with application of extra irrigation water. To measure this ratio, a statistically-significant number of drip emitters are tested and the amount of water collected for each emitter is determined per unit time. The average ("average") delivery rate for all emitters collected is determined. Then the average delivery rate is determined for the lowest 25% of the emitters ("lower ¼").

A high DU means that the emitters in the irrigation system are operating properly and there is little or no fouling or plugging of the irrigation system. Typical DUs for a newly installed irrigation system are usually in the 85 to 90 percent range. DUs conducted before and after a cleaner is used normally provide a good evaluation of the cleaner's effectiveness.

Cleaner Example 11, Distribution Uniformity Evaluation

To determine the efficacy of the present formulation in cleaning an irrigation system, a DU evaluation was conducted on a 45 acre vineyard that was known to have areas in which there was poor distribution of water to some of the grape vines. This particular ranch was irrigated in two sections or blocks of approximately 20.5 acres and 24.5 acres. This division of the acreage into two irrigation blocks is necessitated by limits on the volume that can be pumped into the field and delivered to the crop, which in turn depends on the size of the pump as well as the elevation of the crops being irrigated. The 20.5 acre block was chosen for this study because the grower reported that this block appeared to have the most plugged emitters. A statistically significant number of emitters were selected and assigned identification numbers of 1 through 100. The time interval of water collection from each emitter was five minutes for each stage of the evaluation. First a "before treatment" DU test was conducted, and the water collected from each of the 100 emitters was measured and recorded. Then the block underwent a shock treatment using the formulation of the present invention as described above. After completion of the shock treatment, including the final step of flushing the system with water, an "after treatment" DU test was conducted, and the water collected from each of the same 100 emitters was measured and recorded. This data plus the calculated before and after totals and averages (A100) are set forth in Table 27 below.

TABLE 27

Cleaner Example 11
Distribution Uniformity ("DU") Evaluation, All Emitters Tested

| | Volume of Water Collected (ml) in five minutes | |
|---|---|---|
| Emitter No. | Before Treatment | After Treatment |
| 1 | 133 | 156 |
| 2 | 142 | 161 |
| 3 | 8 | 124 |
| 4 | 150 | 171 |
| 5 | 89 | 163 |
| 6 | 121 | 163 |
| 7 | 137 | 159 |
| 8 | 121 | 165 |
| 9 | 71 | 142 |
| 10 | 0 | 5 |
| 11 | 151 | 157 |
| 12 | 142 | 178 |
| 13 | 21 | 150 |
| 14 | 101 | 161 |
| 15 | 0 | 72 |
| 16 | 132 | 153 |
| 17 | 142 | 172 |
| 18 | 151 | 169 |

TABLE 27-continued

Cleaner Example 11
Distribution Uniformity ("DU") Evaluation, All Emitters Tested

| Emitter No. | Volume of Water Collected (ml) in five minutes | |
|---|---|---|
| | Before Treatment | After Treatment |
| 19 | 130 | 167 |
| 20 | 111 | 171 |
| 21 | 89 | 159 |
| 22 | 121 | 159 |
| 23 | 141 | 169 |
| 24 | 160 | 167 |
| 25 | 147 | 151 |
| 26 | 0 | 0 |
| 27 | 119 | 162 |
| 28 | 76 | 170 |
| 29 | 42 | 142 |
| 30 | 149 | 171 |
| 31 | 111 | 166 |
| 32 | 150 | 161 |
| 33 | 141 | 149 |
| 34 | 156 | 171 |
| 35 | 80 | 154 |
| 36 | 67 | 161 |
| 37 | 121 | 150 |
| 38 | 141 | 159 |
| 39 | 118 | 171 |
| 40 | 138 | 168 |
| 41 | 69 | 142 |
| 42 | 21 | 157 |
| 43 | 145 | 161 |
| 44 | 139 | 146 |
| 45 | 150 | 165 |
| 46 | 155 | 178 |
| 47 | 134 | 172 |
| 48 | 123 | 169 |
| 49 | 152 | 178 |
| 50 | 90 | 145 |
| 51 | 129 | 161 |
| 52 | 141 | 163 |
| 53 | 72 | 159 |
| 54 | 6 | 145 |
| 55 | 150 | 171 |
| 56 | 142 | 162 |
| 57 | 136 | 158 |
| 58 | 101 | 142 |
| 59 | 149 | 167 |
| 60 | 160 | 165 |
| 61 | 155 | 162 |
| 62 | 144 | 159 |
| 63 | 147 | 178 |
| 64 | 160 | 166 |
| 65 | 89 | 149 |
| 66 | 123 | 159 |
| 67 | 23 | 99 |
| 68 | 139 | 149 |
| 69 | 142 | 161 |
| 70 | 159 | 162 |
| 71 | 148 | 160 |
| 72 | 78 | 154 |
| 73 | 5 | 7 |
| 74 | 129 | 160 |
| 75 | 158 | 182 |
| 76 | 149 | 167 |
| 77 | 161 | 166 |
| 78 | 159 | 162 |
| 79 | 149 | 172 |
| 80 | 154 | 171 |
| 81 | 172 | 169 |
| 82 | 147 | 162 |
| 83 | 155 | 169 |
| 84 | 158 | 173 |
| 85 | 131 | 162 |
| 86 | 151 | 166 |
| 87 | 139 | 149 |
| 88 | 16 | 145 |
| 89 | 145 | 162 |
| 90 | 97 | 157 |
| 91 | 154 | 169 |
| 92 | 33 | 145 |
| 93 | 101 | 159 |
| 94 | 158 | 165 |
| 95 | 158 | 149 |
| 96 | 171 | 167 |
| 97 | 160 | 162 |
| 98 | 129 | 155 |
| 99 | 152 | 159 |
| 100 | 102 | 154 |
| Total | 11,884 | 15,468 |
| Average | 118.9 | 154.7 |

Then the lowest 25% of the emitters ("lower ¼") of the "before treatment" DU test were identified and their collected-water data plus the calculated before totals and averages (A¼) are set forth in Table 28 below.

TABLE 28

Cleaner Example 11
Lower ¼ - Before Treatment

| Emitter No. | Volume of Water Collected (ml) in five minutes | |
|---|---|---|
| | Before Treatment | After Treatment |
| 3 | 8 | 124 |
| 5 | 89 | 163 |
| 9 | 71 | 142 |
| 10 | 0 | 5 |
| 13 | 21 | 150 |
| 14 | 101 | 161 |
| 15 | 0 | 72 |
| 21 | 89 | 159 |
| 26 | 0 | 0 |
| 28 | 76 | 170 |
| 29 | 42 | 142 |
| 35 | 80 | 154 |
| 36 | 67 | 161 |
| 41 | 69 | 142 |
| 42 | 21 | 157 |
| 50 | 90 | 145 |
| 53 | 72 | 159 |
| 54 | 6 | 145 |
| 65 | 89 | 149 |
| 67 | 23 | 99 |
| 72 | 78 | 154 |
| 73 | 5 | 7 |
| 88 | 16 | 145 |
| 90 | 97 | 157 |
| 92 | 33 | 145 |
| Total | 1,243 | |
| Average | 49.72 | |

Although the "after treatment" volumes for this set of emitters is listed in Table 28, as that data normally is listed in a DU evaluation, it is not taken into consideration because the "after treatment" lowest 25 percent of emitters are identified from the "after treatment" delivery performances and therefore that set of emitters is not exactly the same. The lowest 25% of the emitters ("lower ¼") of the "after treatment" DU test were identified and their collected-water data plus the calculated before totals and averages (A %) are set forth in Table 29 below.

TABLE 29

Cleaner Example 11
Lower ¼ - After Treatment

| | Volume of Water Collected (ml) in five minutes | |
|---|---|---|
| Emitter No. | Before Treatment | After Treatment |
| 3 | 8 | 124 |
| 9 | 71 | 142 |
| 10 | 0 | 5 |
| 13 | 21 | 150 |
| 15 | 0 | 72 |
| 25 | 147 | 151 |
| 26 | 0 | 0 |
| 29 | 42 | 142 |
| 33 | 141 | 149 |
| 35 | 80 | 154 |
| 37 | 121 | 150 |
| 41 | 69 | 142 |
| 44 | 139 | 146 |
| 50 | 90 | 145 |
| 54 | 6 | 145 |
| 58 | 101 | 142 |
| 65 | 89 | 149 |
| 67 | 23 | 99 |
| 68 | 139 | 149 |
| 72 | 78 | 154 |
| 73 | 5 | 7 |
| 87 | 139 | 149 |
| 88 | 16 | 145 |
| 92 | 33 | 145 |
| 95 | 158 | 149 |
| Total | | 3,105 |
| Average | | 124.2 |

From the calculated averages listed on Tables 27-29, the "before treatment" and "after treatment" DU values were determined as set forth in Equations 7 and 8 below.

$$\text{Before Treatment: } DU=49.72/118.9\times100=41.8\% \quad (7)$$

$$\text{After Treatment: } DU=124.2/154.7\times100=80.3\% \quad (8)$$

The "before" and "after" treatment DU values of Cleaner Example 11 in comparison indicate the vast improvement in irrigation-water distribution uniformity that can be achieved with a shock treatment using the formulation of the present invention. This improved distribution uniformity translates into a significant water conservation and cost savings. For example, assuming the crop being irrigated requires 1.5 acre-feet of water (488,777 gallons)/acre, the amount of additional water required to avoid under-irrigation before and after treatment is set forth below in Equations 9 and 10.

$$\text{Before Treatment: } (1.5 \text{ acre-feet/acre})/0.418=3.59 \text{ acre-feet/acre} \quad (9)$$

$$\text{After Treatment: } (1.5 \text{ acre-feet/acre})/0.803=1.87 \text{ acre-feet/acre} \quad (10)$$

This 1.72 acre-feet/acre saving of water represents a huge cost savings for the water, the energy required for pumping that water, and the fertilizer that is injected into the irrigation water.

The examples above establish the unique efficacy of the present formic acid based irrigation-system cleaner formulation. As noted above, formic acid is the preferred water-soluble organic acid for use in the cleaner formulation of the present invention, and thus it is used exemplary in the above discussion. In broader embodiments the present invention is not limited to the use of formic acid, and the organic acid should have a sufficient water solubility and a sufficiently high acid disassociation constant ("Ka") to achieve the requisite low pHs in dilute solution. In preferred embodiments, in terms of the equivalent pKa (pKa=−log Ka), or pK1a (for the first acid functionality) if a di- or poly-carboxylic acid, the pKa or pK1a is less than about 4.0. The highly preferred formic acid has a pKa of 3.75. Other preferred acids are citric acid (pK1a of 3.14), maleic acid (pK1a of 1.83), and malic acid (pK1a of 3.40). Further, some organic acids are poor candidates, or totally excluded, for use in the present cleaner formulation for other reasons, whereby they are unsuitable for the rigorous cleaning application of the present invention. For instance, oxalic acid (pK1a of 1.23) and tartaric acid (pK1 of 2.98) form insoluble calcium oxalate and calcium tartrate respectively.

The organic acids for the cleaner formulation may be selected from a group of compounds shown below as Formulas V.a and VI.a, provided they have a pKa or pK1a ("pK(1)a") of less than about 4.

$$R_{10}\text{—COOH} \quad (V.a)$$

wherein $R_{10}$ is a hydrogen, lower alkyl having about one to six carbon atoms (e.g. methyl, ethyl, propyl, isopropyl, butyl, isobutyl, pentyl, isopentyl, and hexyl) or substituted lower alkyl having about one to six carbon atoms, (e.g. lower alkyl substituted with hydroxyl, amino, aceto, cyano, anhydride, and carboxylic acids, and

$$(R_{11})(R_{12})C=C(R_{13})COOH \quad (VI.a)$$

where $R_{11}$, $R_{12}$ and $R_{13}$ are independently selected from the group consisting of hydrogen, $C_{1-6}$ lower alkyl (such as methyl, ethyl, propyl, isopropyl, butyl, isobutyl, pentyl, isopentyl, and hexyl) and substituted $C_{1-6}$ lower alkyl wherein the substituents are selected from the group consisting of hydroxyl, amino, aceto, cyano, anhydride, and carboxylic acid, and combinations thereof.

Specific examples of compounds that are encompassed by Formula V.a include, without limitation: formic acid, acetic acid, propionic acid, n-butyric acid, iso-butyric acid, caproic acid, iso-caproic acid, acetoacetic acid, adipic acid, alanine, glycine, aspartic acid, citric acid, malic acid, acetic anhydride, malonic acid, oxalic acid, succinic acid, tartaric acid, valeric acid, cyanoacetic acid, cyanopropionic acid, cyanobutyric acid, dihydroxytartaric acid, glutaric acid, glycolic acid, hydroxybutyric acid, hydroxypropionic acid, and lactic acid.

Specific examples of compounds that are encompassed by Formula VI.a include, without limitation: acrylic acid, ascorbic acid, crotonic acid, dihydroxymaleic acid, fumaric acid, furoic acid, itaconic acid, mesaconic acid, maleic acid, and maleic anhydride.

Formic acid is a preferred organic acid for use in the cleaner formulation not only because of its established efficacy but also because it is economically viable for the present high-volume or bulk use. Formic acid is not only a by-product in the manufacture of other chemicals, such as acetic acid, it can be produced from carbon monoxide and methanol, which react in the presence of a strong base to form methyl formate, followed by hydrolysis, or indirectly by reaction with ammonia to form formamide and then hydrolysis of the formamide. Less economical organic acids can of course be used in the cleaner formulation, but it is unlikely that there will be any practical reason to do so.

The present invention, in broad embodiments, provides an irrigation system cleaning formulation comprising an aqueous cleaning-formulation solution containing a sufficient concentration of a water-soluble organic acid, wherein the water soluble-organic acid has a pK(1)a of less than about 4.0. In preferred embodiments, the aqueous cleaning-formulation solution contains from about 20 to about 60 parts by weight of the water-soluble organic acid per 100 parts by weight of the aqueous cleaning-formulation solution, preferably wherein the water-soluble organic acid is selected from the group consisting of:

 (V.a)

wherein $R_{10}$ is a hydrogen, lower alkyl having about one to six carbon atoms (e.g. methyl, ethyl, propyl, isopropyl, butyl, isobutyl, pentyl, isopentyl, and hexyl) or substituted lower alkyl having about one to six carbon atoms, (e.g. lower alkyl substituted with hydroxyl, amino, aceto, cyano, anhydride, and carboxylic acids and

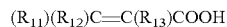 (VI.a)

wherein $R_{11}$, $R_{12}$ and $R_{13}$ are independently selected from the group consisting of hydrogen, $C_{1-6}$ lower alkyl (such as methyl, ethyl, propyl, isopropyl, butyl, isobutyl, pentyl, isopentyl, and hexyl) and substituted $C_{1-6}$ lower alkyl wherein the substituents are selected from the group consisting of hydroxyl, amino, aceto, cyano, anhydride, and carboxylic acid, and combinations thereof.

In further preferred embodiments, the water-soluble organic acid is selected from the group consisting of formic acid, citric acid, maleic acid, malic acid, and combinations thereof. In other preferred embodiments, the water-soluble organic acid is a carboxylic acid having from about 1 to about 3 carboxylic acid groups and from about 2 to about 8 total carbon atoms. In further preferred embodiments, the water-soluble organic acid is selected from the group consisting of formic acid, citric acid maleic acid, malic acid, and combinations thereof.

In preferred embodiments, the aqueous cleaning-formulation solution further contains a sufficient amount of a dispersant. Such dispersant is preferably selected from the group consisting of:

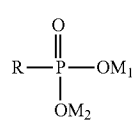 (I)

wherein R is $C_{1-6}$ substituted or unsubstituted lower alkyl or a substituted or unsubstituted mononuclear aryl, and wherein $M_1$ and $M_2$ independently are hydrogen or a water-soluble cation;

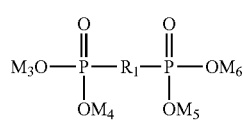 (II)

wherein $R_1$ is a $C_{1-12}$ substituted or unsubstituted alkylene, and wherein $M_3$, $M_4$, $M_5$, and $M_6$ independently are hydrogen or a water-soluble cation; and

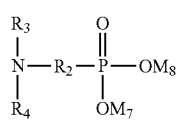 (III)

wherein $R_2$ is a $C_{1-4}$ substituted or unsubstituted alkylene wherein the substituents are selected from the group consisting of amine and hydroxy, wherein $R_3$ is selected from the group consisting of [—$R_2PO(OM_9)(OM_{10})$], H, OH, amino, substituted amino, $C_{1-6}$ substituted or unsubstituted alkyl radical, substituted mononuclear aromatic radical and unsubstituted mononuclear aromatic radical, wherein $R_4$ is $R_3$ or the group shown in Formula IV

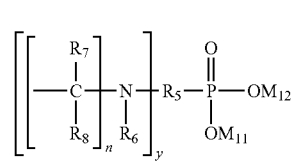 (IV)

wherein $R_7$ and $R_8$ are independently selected from the group consisting of H, $C_{1-6}$ hydroxyl or amino substituted or unsubstituted lower alkyl, hydrogen, hydroxyl, amino, substituted amino, a mononuclear radical, a hydroxyl or amino substituted mononuclear radical, wherein $R_6$ is H or $C_{1-6}$ lower alkyl, wherein $R_5$ is $R_7$, $R_8$ or the group [—$R_2PO(OM_{13})(OM_{14})$], wherein y is a number from about 1 through about 14, and n is a number of from 1 to about 15 and wherein $M_3$, $M_4M_5$, $M_6$ $M_7$, $M_8$, $M_9$, $M_{10}$, $M_{11}$, $M_{12}$, $M_{13}$, and $M_{14}$ independently are water-soluble cations selected from the group consisting of hydrogen, sodium, potassium, ammonium and lithium.

In a preferred embodiment of particular efficacy, practicality and economy, the present invention is an irrigation system cleaning formulation wherein the aqueous cleaning-formulation solution contains from about 20 to about 60 parts by weight of the water-soluble organic acid per 100 parts by weight of the aqueous cleaning-formulation solution, wherein the water-soluble organic acid is substantially formic acid, and wherein the aqueous cleaning-formulation solution further contains a sufficient amount of a water-soluble phosphonate dispersant selected from the group consisting of 1-hydroxy ethylidene diphosphonic acid (HEDP) and aminotrimethylene phosphonic acid) (ATMP).

In another preferred embodiment of particular efficacy, practicality and economy, the present invention is an irrigation system cleaning formulation wherein the aqueous cleaning-formulation solution contains from about 20 to about 60 parts by weight of the water-soluble organic acid per 100 parts by weight of the aqueous cleaning-formulation solution, wherein the water-soluble organic acid is predominantly formic acid, and wherein the aqueous cleaning-formulation solution further contains a sufficient amount of a water-soluble phosphonate dispersant selected from the group consisting of 1-hydroxy ethylidene diphosphonic acid (HEDP) and amino-tri(methylene phosphonic acid) (ATMP).

In another preferred embodiment of particular efficacy, practicality and economy, the present invention is an irrigation system cleaning formulation wherein the aqueous cleaning-formulation solution contains from about 10 to about 80 parts by weight of the water-soluble organic acid per 100 parts by weight of the aqueous cleaning-formulation solution, wherein the water-soluble organic acid is predominantly formic acid, and wherein the aqueous cleaning-formulation solution further contains from about 0.001 to about 5 parts by weight of a water-soluble phosphonate dispersant per 100 parts by weight of the aqueous solution.

The present invention also provides a cleansing irrigation water comprising, in combination, a natural source water and an effective amount of a water-soluble organic acid, wherein the water soluble organic acid has a pK(1)a (in other words, either a pKa or a pK1a) of less than about 4.0. In preferred embodiments, the cleansing irrigation water contains from about 0.01, or more preferably from about 0.1, to about 1.0 parts by weight of the water-soluble organic acid per 100 parts by weight of the cleansing irrigation water. In certain preferred embodiments, the cleansing irrigation water contains a sufficient amount of the water-soluble organic acid to provide a pH of from about 2.5 to about 3.0 (for shock treatment), and in other preferred embodiments the cleansing irrigation water contains a sufficient amount of the water-soluble organic acid to provide a pH of about 6.5 (for maintenance).

In other preferred embodiments of the present cleansing irrigation water, the water-soluble organic acid is selected from the group consisting of:

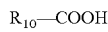
(V.a)

wherein $R_{10}$ is a hydrogen, lower alkyl having about one to six carbon atoms (e.g. methyl, ethyl, propyl, isopropyl, butyl, isobutyl, pentyl, isopentyl, and hexyl) or substituted lower alkyl having about one to six carbon atoms, (e.g. lower alkyl substituted with hydroxyl, amino, aceto, cyano, anhydride, and carboxylic acids) and

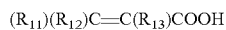
(VI.a)

wherein $R_{11}$, $R_{12}$ and $R_{13}$ are independently selected from the group consisting of hydrogen, $C_{1-6}$ lower alkyl (such as methyl, ethyl, propyl, isopropyl, butyl, isobutyl, pentyl, isopentyl, and hexyl) and substituted $C_{1-6}$ lower alkyl wherein the substituents are selected from the group consisting of hydroxyl, amino, aceto, cyano, anhydride, and carboxylic acid, and combinations thereof. In more preferred embodiments of the present cleansing irrigation water, the water-soluble organic acid is selected from the group consisting of formic acid, citric acid, maleic acid, malic acid, and combinations thereof.

In other preferred embodiments of the present cleansing irrigation water, the water-soluble organic acid is a carboxylic acid having from 1 to about 3 carboxylic acid groups and from about 2 to about 8 total carbon atoms and the cleansing irrigation water further contains a sufficient amount of a dispersant. In further preferred embodiments of the present cleansing irrigation water, the water-soluble organic acid is selected from the group consisting of formic acid, citric acid, maleic acid, malic acid, and combinations thereof and the cleansing irrigation water further contains a sufficient amount of a dispersant, and more preferably a sufficient amount of a dispersant selected from the group consisting of:

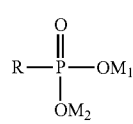
(I)

wherein R is $C_{1-6}$ substituted or unsubstituted lower alkyl or a substituted or unsubstituted mononuclear aryl, and wherein $M_1$ and $M_2$ independently are hydrogen or a water-soluble cation;

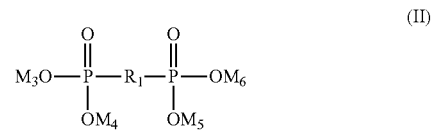
(II)

wherein $R_1$ is a $C_{1-12}$ substituted or unsubstituted alkylene, and wherein $M_3$, $M_4$, $M_5$, and $M_6$ independently are hydrogen or a water-soluble cation; and

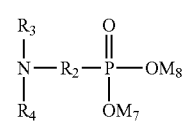
(III)

wherein $R_2$ is a $C_{14}$ substituted or unsubstituted alkylene wherein the substituents are selected from the group consisting of amine and hydroxy, wherein $R_3$ is selected from the group consisting of $[-R_2PO(OM_9)(OM_{10})]$, H, OH, amino, substituted amino, $C_{1-6}$ substituted or unsubstituted alkyl radical, substituted mononuclear aromatic radical and unsubstituted mononuclear aromatic radical, wherein $R_4$ is $R_3$ or the group shown in Formula IV

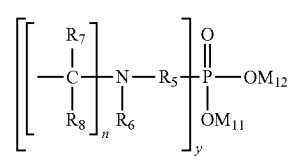
(IV)

wherein $R_7$ and $R_8$ are independently selected from the group consisting of H, $C_{1-6}$ hydroxyl or amino substituted or unsubstituted lower alkyl, hydrogen, hydroxyl, amino, substituted amino, a mononuclear radical, a hydroxyl or amino substituted mononuclear radical, wherein $R_6$ is H or $C_{1-6}$ lower alkyl, wherein $R_5$ is $R_7$, $R_8$ or the group $[-R_2PO(OM_{13})(OM_{14})]$, wherein y is a number from about 1 through about 14, and n is a number of from 1 to about 15, wherein $M_3$, $M_4$, $M_5$, $M_6$ $M_7$, $M_8$, $M_9$, $M_{10}$, $M_{11}$, $M_{12}$, $M_{13}$, and $M_{14}$ independently are water-soluble cations selected from the group consisting of hydrogen, sodium, potassium, ammonium and lithium.

In a preferred cleansing irrigation water embodiment of particular efficacy, practicality and economy, the water-soluble organic acid is substantially formic acid and the cleansing irrigation water further contains a sufficient amount of a water-soluble phosphonate dispersant selected from the group consisting of 1-hydroxy ethylidene diphosphonic acid (HEDP) and amino-tri(methylene phosphonic acid) (ATMP). In another preferred cleansing irrigation water embodiment of particular efficacy, practicality and economy, the water-soluble organic acid is predominantly formic acid and the cleansing irrigation water further contains a sufficient amount of a water-soluble phosphonate dispersant selected from the group consisting of 1-hydroxy ethylidene diphosphonic acid (HEDP) and amino-tri(methylene phosphonic acid) (ATMP).

In a further preferred cleansing irrigation water embodiment of particular efficacy, practicality and economy, the water-soluble organic acid is predominantly formic acid and the cleansing irrigation water further contains from about 0.005 to about 20 parts by weight of a water-soluble phosphonate dispersant per 100 parts by weight of the water-soluble organic acid.

The present invention also provides a method of cleaning an irrigation system, comprising the steps of: (1) introducing a sufficient amount of a cleaning formulation containing a sufficient concentration of a water-soluble organic acid having a pK(1)a of less than about 4.0 to irrigation water; and (2) feeding the irrigation water to the irrigation system. The method of cleaning an irrigation system preferably includes the additional steps of: introducing a sufficient amount of the cleaning formulation to the irrigation water to lower the pH of the irrigation water to about 2.5 to about 3.5 (shock treatment); feeding the acidified irrigation water to the irrigation system for a sufficient time period to distribute the acidified irrigation water substantially throughout a block of the irrigation system; then stopping the flow of the irrigation water; then allowing the acidified irrigation water to stand in the block of the irrigation system for a sufficient amount of time; and then flushing the block of the irrigation system.

In other preferred embodiments, the method of cleaning an irrigation system further includes the additional steps of: introducing a sufficient amount of the cleaning formulation to the irrigation water to lower the pH of the irrigation water to about 2.5 to about 3.5 (shock treatment); feeding the acidified irrigation water to the irrigation system for a sufficient time period to distribute the acidified irrigation water substantially throughout a block of the irrigation system; then stopping the flow of the irrigation water; then allowing the acidified irrigation water to stand in the block of the irrigation system for a time period of from about 3 to about 24 hours; and then flushing the block of the irrigation system.

In further preferred embodiments, the method of cleaning an irrigation system includes the additional steps of: introducing a sufficient amount of the cleaning formulation to the irrigation water to lower the pH of the irrigation water to about 2.5 to about 3.5 (shock treatment); feeding the acidified irrigation water to the irrigation system for a time period of from about 40 to about 60 minutes to distribute the acidified irrigation water substantially throughout a block of the irrigation system; then stopping the flow of the irrigation water; then allowing the acidified irrigation water to stand in the block of the irrigation system for a time period of from about 3 to about 24 hours to dissolve deposits in the irrigation system; and then flushing the block of the irrigation system.

In still further preferred (shock treatment) embodiments, the cleaning formulation further contains a sufficient amount of a water-soluble phosphonate dispersant and the method of cleaning an irrigation system includes the additional steps of: introducing a sufficient amount of the cleaning formulation to the irrigation water to lower the pH of the irrigation water to about 2.5 to about 3.5; feeding the acidified irrigation water to the irrigation system for a time period of from about 40 to about 60 minutes to distribute the acidified irrigation water substantially throughout a block of the irrigation system; then stopping the flow of the irrigation water; then allowing the acidified irrigation water to stand in the block of the irrigation system for a time period of from about 3 to about 24 hours to dissolve deposits and suspend particles in the irrigation system; and then flushing the block of the irrigation system.

In still further preferred (maintenance) embodiments, the method of cleaning an irrigation system includes the additional steps of introducing a sufficient amount of the cleaning formulation to the irrigation water to lower the pH of the irrigation water to about 6.5; and irrigating a field by distribution of the acidified irrigation water via the irrigation system while maintaining the cleanliness of the irrigation system by the inhibition of deposit formation.

In additional preferred (maintenance) embodiments, the cleaning formulation further contains a sufficient amount of a water-soluble phosphonate dispersant, and method of cleaning an irrigation system includes the additional steps of: introducing a sufficient amount of the cleaning formulation to the irrigation water to lower the pH of the irrigation water to about 6.5; and irrigating a field by distribution of the acidified irrigation water via the irrigation system while maintaining the cleanliness of the irrigation system by the inhibition of deposit formation and the suspension of particles.

While the foregoing written description of the invention enables one of ordinary skill in the art to make and use the invention, and to make and use what is presently considered the best mode of the invention, those of ordinary skill in the art will understand and appreciate the existence of variations, combinations and equivalents of the specific embodiments, methods and examples provided herein. The present invention should not be limited by the above described embodiments, methods and examples.

We claim:

1. A method of cleaning a block of an irrigation system fouled by calcium carbonate deposits, comprising the steps of:
    (step 1) introducing a cleaning formulation consisting of water and a water-soluble organic acid having a pK(1)a of less than 4.0 to irrigation water to lower the pH of said irrigation water to 2.5 to 3.5 whereby acidified irrigation water is formed;
    (step 2) distributing said acidified irrigation water substantially throughout said block of said irrigation system;
    (step 3) then stopping the flow of said acidified irrigation water;
    (step 4) then completely dissolving said calcium carbonate deposits by allowing said acidified irrigation water to stand in said block of said irrigation system for a time period of from 3 to 24 hours; and
    (step 5) then flushing said block of said irrigation system.

2. The method of cleaning a block of an irrigation system fouled by calcium carbonate deposits according to claim 1, wherein said water-soluble acid is formic acid.

* * * * *